(12) United States Patent
Barstow

(10) Patent No.: US 7,912,845 B2
(45) Date of Patent: Mar. 22, 2011

(54) METHODS AND SYSTEMS FOR DATA INTEGRATION

(75) Inventor: James F. Barstow, Oakland, CA (US)

(73) Assignee: Symyx Software, Inc., Sunnyvale, CA (US)

( * ) Notice: Subject to any disclaimer, the term of this patent is extended or adjusted under 35 U.S.C. 154(b) by 35 days.

(21) Appl. No.: 12/482,353

(22) Filed: Jun. 10, 2009

(65) Prior Publication Data
US 2010/0076992 A1    Mar. 25, 2010

Related U.S. Application Data

(63) Continuation of application No. 10/858,897, filed on Jun. 1, 2004, now abandoned.

(51) Int. Cl.
*G06F 7/00* (2006.01)
(52) U.S. Cl. .......................... 707/756; 707/759; 707/741
(58) Field of Classification Search .................. None
See application file for complete search history.

(56) References Cited

U.S. PATENT DOCUMENTS

| | | | |
|---|---|---|---|
| 4,982,338 A | 1/1991 | Fujita | |
| 5,047,929 A | 9/1991 | Fujita | |
| 5,056,035 A | 10/1991 | Fujita | |
| 5,566,333 A | 10/1996 | Olson et al. | |
| 5,574,656 A | 11/1996 | Agrafiotis et al. | |
| 5,708,806 A | 1/1998 | DeRose et al. | |
| 5,848,415 A | 12/1998 | Guck | |
| 5,855,013 A | 12/1998 | Fisk | |
| 5,875,446 A | 2/1999 | Brown et al. | |
| 5,962,013 A | 10/1999 | Wong et al. | |
| 5,978,792 A | 11/1999 | Bhargava et al. | |
| 5,980,096 A | 11/1999 | Thalhammer-Reyero | |
| 6,030,917 A | 2/2000 | Weinberg et al. | |
| 6,189,012 B1 | 2/2001 | Mital et al. | |
| 6,192,373 B1 | 2/2001 | Haegele | |
| 6,343,291 B1 | 1/2002 | Goldman | |
| 6,410,331 B1 | 6/2002 | Schultz et al. | |
| 6,415,276 B1 | 7/2002 | Heger et al. | |
| 6,519,618 B1 | 2/2003 | Snyder | |
| 6,598,043 B1 | 7/2003 | Baclawski | |

(Continued)

FOREIGN PATENT DOCUMENTS

WO     WO 00/23921     4/2000

(Continued)

OTHER PUBLICATIONS

U.S. Appl. No. 09/174,856, filed Oct. 19, 1998, Lacy et al.

(Continued)

*Primary Examiner* — Pierre M Vital
*Assistant Examiner* — Christopher J Raab
(74) *Attorney, Agent, or Firm* — McDermott Will & Emery LLP

(57) ABSTRACT

A preferred method embodiment of the subject invention comprises a method for dynamically creating hierarchies to be used in database searches, comprising the steps of: (a) defining a data network; (b) receiving a query regarding data stored in one or more databases; and (c) based at least in part on said query and on said data network, dynamically building a hierarchy. A preferred system embodiment of the subject invention comprises a system for dynamically creating hierarchies to be used in database searches, comprising: (a) means for defining a data network; (b) means for receiving a query regarding data stored in one or more databases; and (c) means for, based at least in part on said query, dynamically building a hierarchy from said data network.

24 Claims, 13 Drawing Sheets

U.S. PATENT DOCUMENTS

| | | |
|---|---|---|
| 6,618,852 B1 | 9/2003 | Van Eikeren et al. |
| 6,658,429 B2 | 12/2003 | Dorsett, Jr. |
| 6,738,529 B1 | 5/2004 | Crevier et al. |
| 6,839,716 B1 | 1/2005 | Della-Libera et al. |
| 6,947,953 B2 | 9/2005 | Herzenberg et al. |
| 6,968,536 B2 | 11/2005 | Jazdzewski |
| 6,983,227 B1 | 1/2006 | Thalhammer-Reyero |
| 7,188,055 B2 | 3/2007 | Agrafiotis et al. |
| 7,199,809 B1 | 4/2007 | Lacy et al. |
| 7,308,363 B2 | 12/2007 | Eker et al. |
| 7,478,337 B2 | 1/2009 | Kodosky et al. |
| 2001/0047398 A1 | 11/2001 | Rubenstein |
| 2001/0051948 A1 | 12/2001 | Srinivasan et al. |
| 2002/0049548 A1 | 4/2002 | Bunin |
| 2002/0138469 A1 | 9/2002 | Horovitz et al. |
| 2002/0139460 A1 | 10/2002 | Boiocchi et al. |
| 2002/0184211 A1 | 12/2002 | Gruenwald |
| 2003/0000494 A1 | 1/2003 | Kremer et al. |
| 2003/0097357 A1 | 5/2003 | Ferrari et al. |
| 2003/0105771 A1 | 6/2003 | Tiefenbrun et al. |
| 2004/0044990 A1 | 3/2004 | Schloegel et al. |
| 2004/0162834 A1 | 8/2004 | Aono et al. |
| 2004/0199524 A1 | 10/2004 | Rys et al. |
| 2004/0221260 A1 | 11/2004 | Martin et al. |
| 2005/0050011 A1 | 3/2005 | Van Der Linden et al. |
| 2005/0130229 A1 | 6/2005 | Dorsett, Jr. |
| 2005/0267721 A1 | 12/2005 | Thalhammer-Reyero |
| 2005/0273305 A1 | 12/2005 | Thalhammer-Reyero |
| 2006/0064674 A1 | 3/2006 | Olson, Jr. et al. |
| 2006/0168515 A1 | 7/2006 | Dorsett, Jr. |
| 2006/0277201 A1 | 12/2006 | Dorsett, Jr. |
| 2007/0050092 A1 | 3/2007 | Kenyon et al. |
| 2007/0143240 A1 | 6/2007 | Goldwasser et al. |
| 2007/0185657 A1 | 8/2007 | Lacy et al. |
| 2007/0203951 A1 | 8/2007 | Dorsett, Jr. |
| 2007/0214101 A1 | 9/2007 | Wang et al. |
| 2008/0015837 A1 | 1/2008 | Smith et al. |

FOREIGN PATENT DOCUMENTS

| | | |
|---|---|---|
| WO | WO 03/083643 | 10/2003 |
| WO | WO 03/107323 | 12/2003 |
| WO | WO 03/107576 | 12/2003 |
| WO | WO 2005/052810 | 6/2005 |

OTHER PUBLICATIONS

U.S. Appl. No. 11/325,267, filed Jan. 3, 2006, Falcioni et al.

Backofen, R. et al., "Application of constraint programming techniques for structure prediction of lattice proteins with extended alphabets", (Feb. 1999), 17 pages.

Barr, R.S. et al., "Designing and reporting on computational experiments with heuristic methods", Journal of Heuristics Kluwer Academic Publishers Netherlands, vol. 1, No. 1 (Sep. 1995), pp. 9-32.

Chrysanthis, P. et al., "From Location Databases to Pervasive Catalog", Proceedings of the 13th International Workshop in Database and Expert Systems Application held Sep. 2002, *IEEE*, pp. 1-6.

David, M.M., "ANSI SQL Hierarchical Processing Can Fully Integrate Native SML", [online], 2003 [retrieved on Sep. 28, 2005]. Retrieved from the Internet: <URL:http://www.sigmod.org/sigmod/record/issues/0303/7.sql-hier-proc.pdf>.

Raynor, W., The International Dictionary of Artificial Intelligence, (1999), p. 63 and cover only.

Shaheen, M. et al., "Remote Laboratory Experimentation", Proceedings of the American Control Conference, Philadelphia, PA, (Jun. 1998), pp. 1326-1329.

Thayer, A. "Combinatorial Chemistry Becoming Core Technology at Drug Discovery Companies", Chem Eng. News, (Feb. 12, 1996), pp. 57-64.

Umetrics AB, MODDE 4-0 Users Guide, Copyright 1992-1997, pp. 1-1 to 14-2 (229 pages) "Graphical Software for Design of Experiments".

Zou, J. et al., "Statistical Theory of Combinatorial Libraries of Folding Proteins: Energetic Discrimination of a Target Structure", J Mol Biol, vol. 296 (2009), pp. 281-294.

Khoral Research Inc., "The Kohros Visual Programming Environment", chapter 1 and Appendix A, URL: ftp://ftp.tnt.uni-hannover.de/pub/soft/khor.

National Instruments LabVIEW User Manual, Apr. 2003 Edition, URL: http://www/ni/com/pdf/manuals/320999e.pdf 2003.

National Instruments LabVIEW Application Builder User Guide, URS: http//www.ni.com/pdf/manuals/323563a.pdf.

METHODS AND SYSTEMS FOR DATA INTEGRATION

CROSS-REFERENCE TO RELATED APPLICATION

This application is a continuation of U.S. application Ser. No. 10/858,897, filed Jun. 1, 2004. The disclosure of the foregoing application is incorporated herein by reference in its entirety.

BACKGROUND

In the past, support for complex data models requiring integration was provided within each data source or through code written by the customer or consultant. For example, the complex data hierarchy used in Beilstein databases is built into Beilstein itself. Relational databases such as Oracle have no such capability and require expert knowledge of the underlying table structure, SQL, and programming in order to integrate the data in a way that is accessible to end users.

One existing integration system is ISIS ("Integrated Scientific Information System"), a product of MDL Information Systems, Inc. of San Leandro, Calif. ISIS is a leading informatics system in the life science and chemical industries. The ISIS/Host API is a C interface that provides integration of data sources and structure searching. The Hview is an editable text file that informs ISIS/Host of how the end user will see this integration. Using the Hview, ISIS/Host can open similar databases that reside on one or more host computers and present a unified view of the data to ISIS users.

Although the Hview provides a very powerful way of describing data models, it has some serious limitations. First, it is too rigid. For example, a given data model may be viewed as many different hierarchies; sometimes it even makes sense to query one hierarchy and retrieve another. In the ISIS domain, viewing data via different Hviews is problematic, and may require a programmer to write custom code. Second, Hviews support a limited set of data relationships. Pivoting of data is functionality that almost every customer requires, yet it is not supported directly by ISIS/Host. Even in the simplest pivoting case, searching and retrieving data is a two-step process; in most cases, it is far more complex. Finally, the syntax of Hviews is arcane; some companies have experts dedicated to writing and maintaining Hviews. Although the underlying process of describing complex data models may always require experts, the syntax used should make the process easier, not harder.

Goals of a preferred system embodiment of the present invention comprise the following. First, the system should be flexible and make it easier to provide multiple hierarchical views of the same data model. Second, the system should be extensible to allow, new unforeseen data relationships to be defined. Third, the process of describing a data model should not be made more difficult via an arcane syntax.

SUMMARY

In a preferred embodiment of the present invention, integration is provided via an Integrating Data Source (IDS). This data source may be accessed and manipulated using standard interfaces; queries may be made using hierarchical extensions to SQL (UQL) and data may be returned in hierarchical recordsets. (UQL (Unified Query Language) is discussed in greater detail below.)

IDS provides a method for posing hierarchical queries across multiple data sources through a predefined data network. In the IDS, data networks are constructed from "nodes" and "connectors." One data network replaces multiple Hviews. Each node in the network is a relational table or other source of data. Each edge in the network is an XML-defined connector that describes the relationship between the two nodes. The connectors may be defined in static files or created in simple java code at run time.

In contrast to the Hview model, the hierarchical views assembled by the IDS are not static. Many different hierarchies can be constructed dynamically from a single data network depending on the path taken through the network. The starting point in the network becomes the root of the constructed hierarchy. Given a single query, there may be many ways the query could be applied to the network, resulting in different hierarchies. These hierarchies reflect different relationships of the data involved in the query.

Each edge in the network is defined by a connector which describes the data relationship between the two nodes. This data relationship can have a multiplicity of one-to-one or one-to-many and can be involved a transformation of the resulting data (e.g., pivoting). Connectors are directional; to have a connection in both directions, two connectors are defined.

A given connector encapsulates the implementation of a particular data relationship, including translating the query and retrieving data. Most connectors are built by extending one of a small set of basic connectors, then overriding a few methods. General points about connectors comprise:

1. Connectors describe a relationship between two sets of data.
2. A given set of data can be a relational table, SQL statement, calculation, data source, etc.
3. Relationships can be 1-1, 1-many, many-many.
4. Connectors are responsible for generating SQL for searching and retrieval of their associated data.
5. Connectors either retrieve data immediately or defer retrieval until requested.
6. Connectors can transform data transparently (e.g., pivoting).
7. Connectors are easily extended to support new relationships or functionality.

A preferred method embodiment of the subject invention comprises a method for dynamically creating hierarchies to be used in database searches, comprising the steps of: (a) defining a data network; (b) receiving a query regarding data stored in one or more databases; and (c) based at least in part on said query and on said data network, dynamically building a hierarchy. In related embodiments: (1) the data network comprises nodes and connectors; (2) the step of defining a data network comprises linking one or more source nodes to one or more linked nodes via connectors; (3) the connectors comprise output field elements and define relationships between the nodes; (4) a hierarchy is built based on output fields and relationships; (5) there is a step of identifying a root connector in a data network based on a query; (6) the data network is defined based on a relational data model; (7) the step of defining a data network comprises analyzing a data model to identify objects to be exposed; (8) the step of defining a data network comprises analyzing an inheritance tree of identified objects; (9) the step of defining a data network comprises analyzing relationships between objects; (10) relationships between objects comprise multiplicity relationships and reciprocal relationships; (11) the step of defining a data network comprises defining connectors for each of the objects; (12) the step of defining connectors for each of the objects results in exposing relevant data in a hierarchy appropriate for the object; (13) the connectors form subnetworks;

(14) for each subnetwork, the connectors therein are modified to reflect relationships between objects in the network; (15) the connectors comprise connectors that transform data; and (16) the connectors comprise connectors that integrate data from external sources.

Another preferred method embodiment of the subject invention comprises a method of querying a data network, comprising the steps of: (a) selecting desired fields; (b) specifying a root; (c) specifying a search condition; and (d) specifying a path to each of one or more of said desired fields. In related embodiments: (1) the step of specifying a root comprises specifying a FROM clause; (2) each path corresponds to a set of connectors; and (3) the set of connectors comprises one or more of the following: one to many connector, one to one connector, pivot connector.

A preferred system embodiment of the subject invention comprises a system for dynamically creating hierarchies to be used in database searches, comprising: (a) means for defining a data network; (b) means for receiving a query regarding data stored in one or more databases; and (c) means for, based at least in part on said query, dynamically building a hierarchy from said data network.

Another preferred system embodiment of the subject invention comprises a system for querying a data network, comprising: (a) means for selecting desired fields; (b) means for specifying a root; and (c) means for specifying a search condition.

Another preferred system embodiment of the subject invention comprises a system for querying databases, comprising: (a) an electronic query server operable to receive electronic communications from and transmit electronic communications to a user terminal via an electronic communication network; and (b) one or more database servers in electronic communication with the query server and operable to search one or more databases; wherein the query server is operable to receive an electronic query over an electronic communication network from the user terminal and, based on that query, dynamically create one or more hierarchies. In related embodiments: (1) one or more hierarchies are created based on data networks; and (2) the data networks comprise nodes connected by connectors and each node corresponds to a set of data.

DETAILED DESCRIPTION OF PREFERRED EMBODIMENTS

Figure 1:
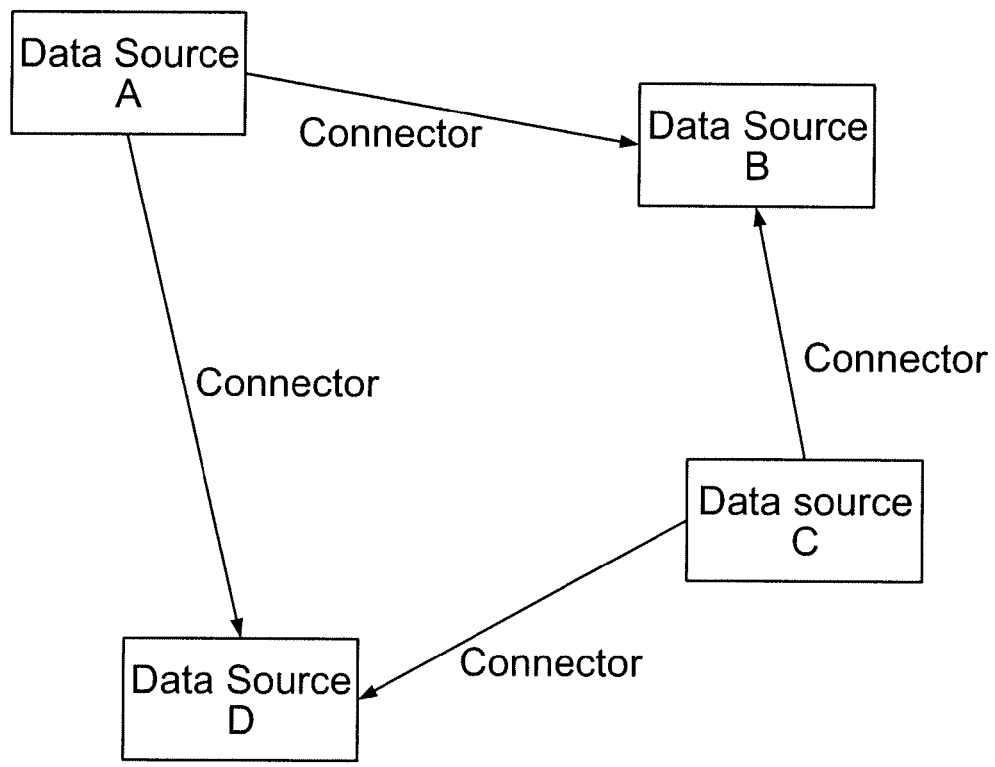
FIG. 1 depicts a simple exemplary data network of a preferred embodiment.
Figure 2:
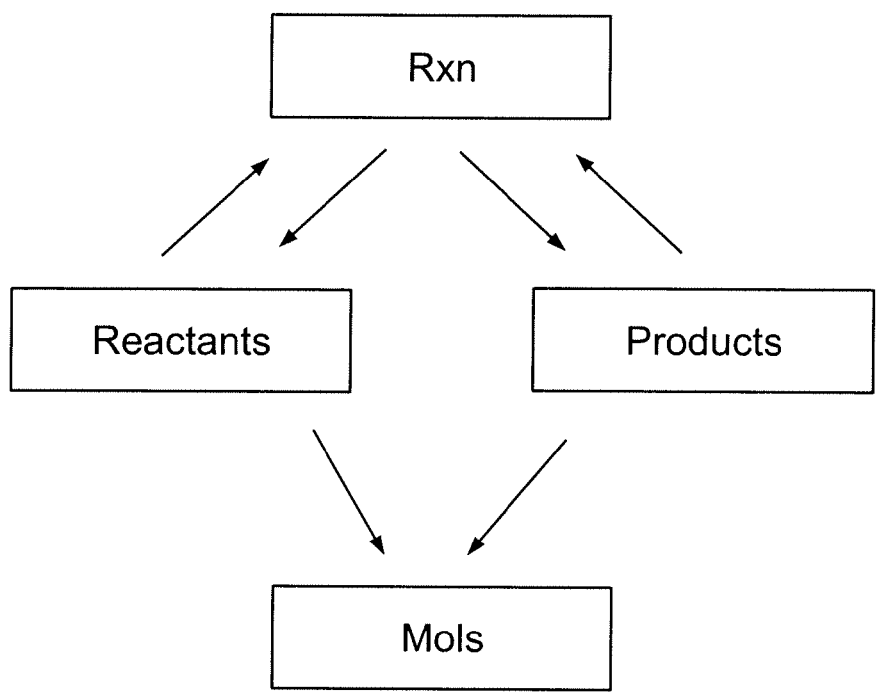
FIG. 2 depicts a graphical view of an exemplary network.

In a preferred embodiment, an integrating data source (IDS) is a data source combined with one or more other data sources (typically including a relational data source) to form a data network. Based on a provided data model, a data model expert may create a data network. This transforms the data into one or more hierarchical views and provides the ability to search across these data sources and return sets of integrated results. Connectors specify the data relationships between the sources of data. FIG. 1 depicts a simple data network.

Connectors with one-to-one or one-to-many data relationships may be used to build a network. Connectors generate SQL statements for search and retrieval of the connectors' associated data.

Data sources in the data network can be a single relational table, a calculation, the results of a SELECT statement, an external data source—potentially anything that supplies data.

The data network can be a simple one—connectors between several sources of data. Or it can be much more complex—thousands of sources of data with connectors linking them. A data network using IDS connectors provides a customized set of data views tailored to the workflow and requirements of a particular usage. In contrast to the Hview model, one data network may replace multiple Hviews and a given data model may be viewed as many different hierarchies. The hierarchical views assembled by the IDS are not static. Flexibility is highly desirable and is an integral feature of IDS. A well-designed data network will allow hierarchies to be built which the designer did not foresee. For example, sometimes it is advantageous to query one hierarchy but retrieve from another.

Another advantage to using IDS is that it permits data transformations, such as pivoting, to occur dynamically. This is just one example of the ability to transform data from the form in which it is stored in a database into a form to which an end user is accustomed. In addition, with IDS one may specify multiple starting points, or roots, for a given search.

Queries preferably are made using the hierarchical extensions of Unified Query Language (UQL) and data are returned in hierarchical recordsets.

The following steps detail preferred IDS workflow.

1. Database administrator analyzes the needs of a site.

2. Database administrator installs databases and sets up accounts for system administrators.

3. System administrator adds database contexts and assigns users to these contexts.

4. System administrator creates data source definitions. XML files are created from these definitions.

5. A data model expert (with system administrator privileges) builds the network.

6. Once the data model expert has built and tested the data network, the system administrator publishes the data network to the server.

7. A scientist (for example) queries the databases using the data network. The scientist creates the queries using the hierarchical extensions of UQL, and data is returned in hierarchical recordsets.

In some cases, it may be necessary to define new, unforeseen data relationships not supported by the standard IDS connectors. If so, the data model expert specifies new connectors as needed and passes the specifications to a developer. The developer builds the required connectors.

About Connectors

A connector is the basic building block of a data network in an integrating data source. A connector is an XML description of the relationship between nodes of data in a data network. This relationship is used by the connector when it generates the native query for the search and retrieval of the linked data. The relationship can be one-to-one or one-to-many. The relationship also specifies whether the data retrieval is performed immediately or deferred until requested.

Figure 4:
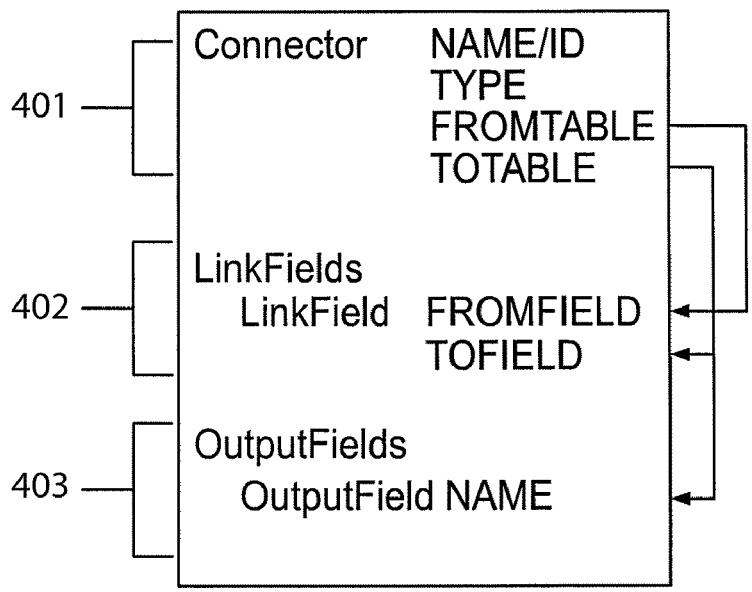
FIG. 4 shows basic portions of a preferred connector description.

FIG. 4 shows basic portions of a Connector description. Most connectors have at least the Connector, LinkFields, and OutputFields elements. Portion 401 identifies the connector and specifies its type, the source node (FROMTABLE), and the linked node (TOTABLE). Portion 402 specifies which fields in the source node (FROMFIELD) are linked to which fields in the linked node (TOFIELD). Portion 403 lists which data in the linked node will be output. These are the fields that this connector provides access to, and become available to the SELECT and WHERE clauses of a unified query on the data network.

How Connectors Build a Data Network

Figure 5:
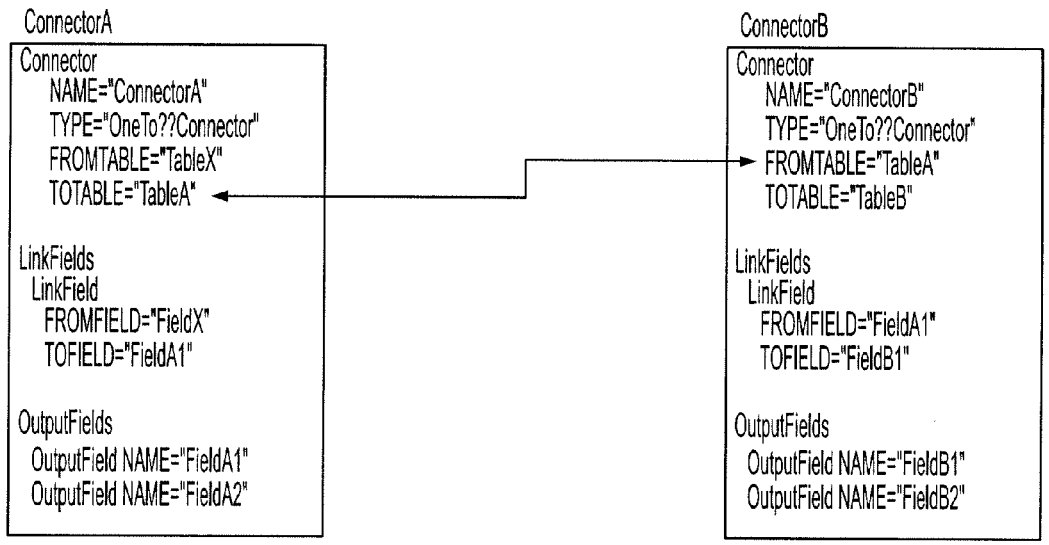
FIG. 5 shows exemplary connector definitions for a source node and a linked node and the network they form.

Although a connector establishes the link between the source node and the linked node, it preferably defines access only to the data in the linked node. Access to the data in the source node preferably is defined by another connector. To access data in both the source node and the linked node, one preferably needs a connector for each node. FIG. 5 shows two connector definitions for the source node and the linked node, and shows how they form a very simple data network.

The data in this network is defined by the output fields in each connector. The hierarchy retrieved from a query is derived from the specified output fields and the relationships defined by their connectors. The multiplicity of the relationships between two nodes affect the shape of the hierarchy. For a one-to-one relationship, the output fields of the linked node are merged to the output fields of the source node. For a one-to-many relationship, a parent field is created in the source data. For example, if the relationship between ConnectorA and ConnectorB in the example is one-to-one, the derived hierarchy looks like the following:

```
FieldA1
FieldA2
FieldB1
FieldB2
```

If the relationship between ConnectorA and ConnectorB in the example is one-to-many, the derived hierarchy looks like the following:

```
FieldA1
FieldA2
ConnectorB (parent field)
    FieldB1
    FieldB2
```

The data network we just described is simply a series of connectors, with no entry point to the network. To allow a query to be submitted on this data network, there must be a root connector. The root connector represents what type of data can be queried on this data network. The root connector is what must be specified in the FROM clause of the query.

Figure 6:
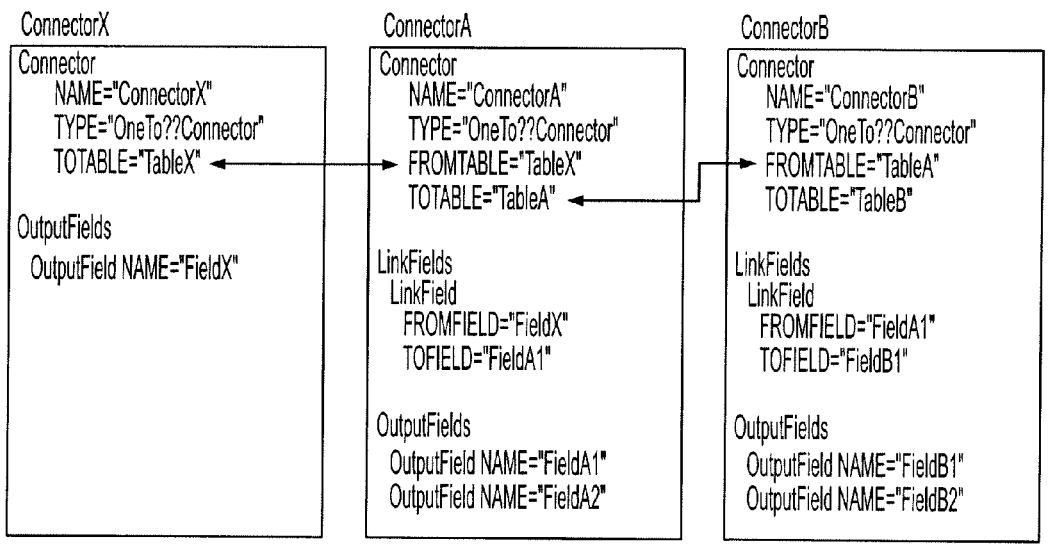
FIG. 6 shows a root connector added to the network of FIG. 5.

FIG. 6 shows another connector, ConnectorX, added to the data network.

ConnectorX is the root connector in this data network. As shown, ConnectorX must also have its own Connector element definition. To specify ConnectorX as a root connector, it must be added in the Roots section of the Connection element:

```
<Roots>
    <Root ID="ConnectorX"/>
</Roots>
```

If the relationships between ConnectorX, ConnectorA, and ConnectorB are one-to-one, the derived hierarchy looks like the following:

```
FieldX
FieldA1
FieldA2
FieldB1
FieldB2
```

If the relationships between ConnectorX, ConnectorA, and ConnectorB are one-to-many, the derived hierarchy looks like the following:

```
FieldX
Connector A (parent field)
    FieldA1
    FieldA2
    ConnectorB (parent field)
        FieldB1
        FieldB2
```

Using the one-to-many relationship as an example, the following query can be submitted:

```
select FieldX, ConnectorA.FieldA2, ConnectorB.*
    from ConnectorX where ConnectorA.FieldA1 = 'someValue'
```

Note that the ConnectorX definition does not have a FROMTABLE attribute and does not define LinkFields because it does not link from a source node. However, it is also possible to define a connector that links two nodes (such as ConnectorA or ConnectorB) as a root connector.

Figure 7:
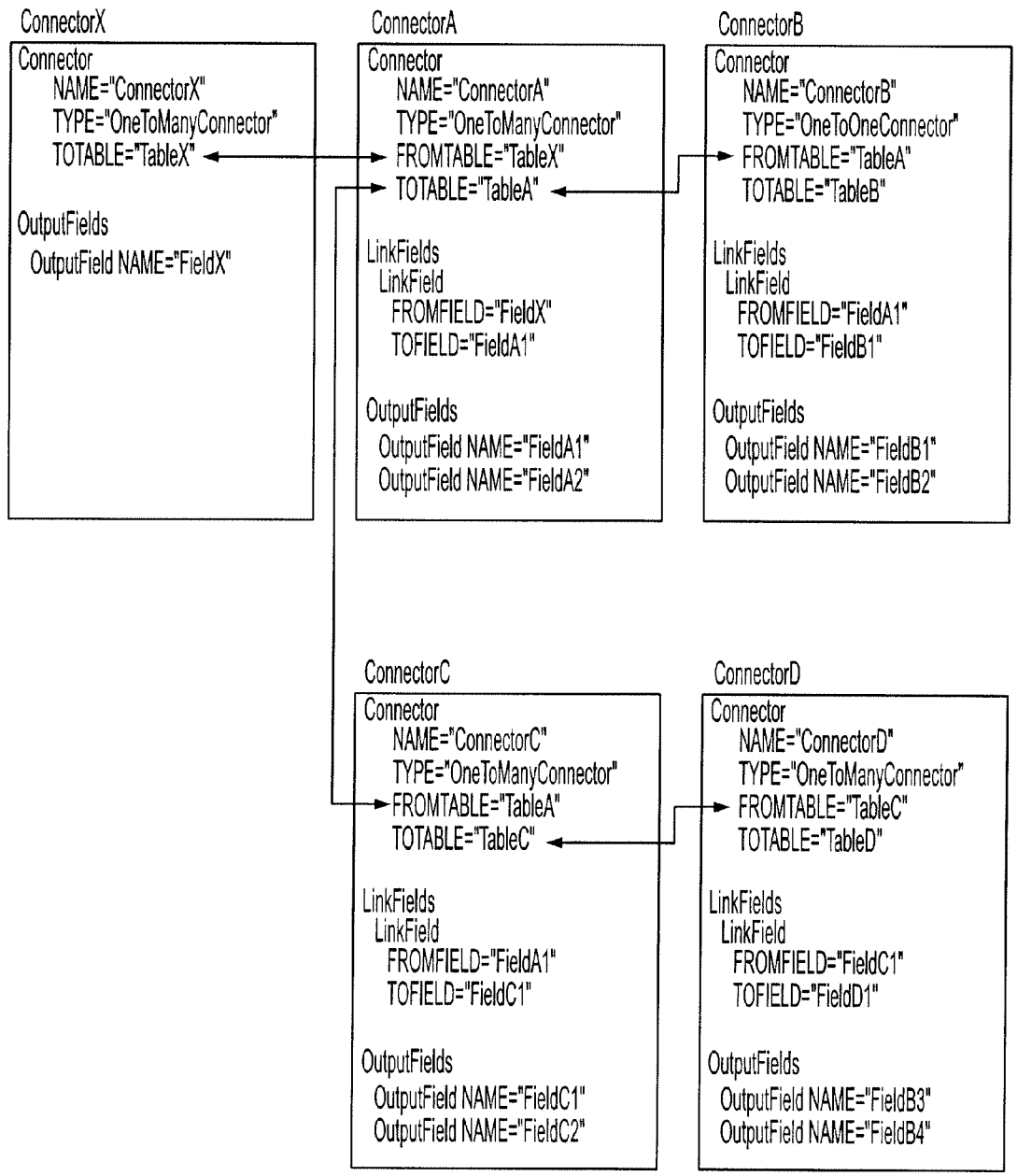
FIG. 7 shows two additional connectors added to the network of FIG. 6.

One can also define multiple connectors that link from the same source node, and multiple connectors that link to the same linked node. In FIG. 7, new connectors, ConnectorC and ConnectorD, are added to the data network used in the previous examples. ConnectorB and ConnectorC both link from TableA, and ConnectorB and ConnectorD both link to TableB.

Using the illustrated data network, the following query selects all the output fields from all the connectors:

```
select *, ConnectorA.*, ConnectorA.ConnectorC.*,
    ConnectorA.ConnectorC.ConnectorD.*
    from ConnectorX
    where ConnectorA.ConnectorC.FieldC1 = 'someValue'
```

The following shows the derived hierarchy:

```
FieldX
    ConnectorA
        FieldA1
        FieldA2
        FieldB1
        FieldB1
        ConnectorC
            FieldC1
            FieldC2
            ConnectorD
                FieldB3
                FieldB4
```

The type of ConnectorA, ConnectorC, and ConnectorD is OneToManyDataConnector; the one-to-many relationship created the corresponding parent and lower-level fields. The type of ConnectorB is OneToOneDataConnector; the one-to-one relationship added the fields into the ConnectorA (source node) parent. Note that selecting "*" in the query does not retrieve the lower-level fields. To retrieve the fields under a parent, specify the connector name as a path to the fields. For example, "select * from ConnectorX" will only select the output fields of ConnectorX. To select the fields of ConnectorX and ConnectorD, specify "select *, ConnectorA.ConnectorC.ConnectorD.* from ConnectorX".

In many cases, there are application users who would only be interested at the data in certain levels of the hierarchy. Using the preceding example, the following query returns a lower-level (ConnectorC) field based on another lower-level (ConnectorD) field:

```
select ConnectorA.ConnectorC.FieldC1 from ConnectorX
where ConnectorA.ConnectorC.ConnectorD.FieldB4 = 'someValue'
```

To make it easier to access these nodes in the data network, you can add ConnectorC as a root:

```
<Roots>
    <Root ID="ConnectorX"/>
    <Root ID="ConnectorC"/>
</Roots>
```

This makes ConnectorC another entry point in the data network. Defining ConnectorC as a root connector pulls its data up into the root level of a hierarchy, without changing the underlying data model. The following then becomes another hierarchy that is available in the data network:

```
FieldC1
FieldC2
ConnectorD
    FieldB3
    FieldB4
```

Using the new root, the following simpler query can be submitted:

```
select FieldC1 from ConnectorC
where ConnectorD.FieldB4 = 'someValue'
```

An Example: Connectors for a Reaction Data Network

Figure 8:
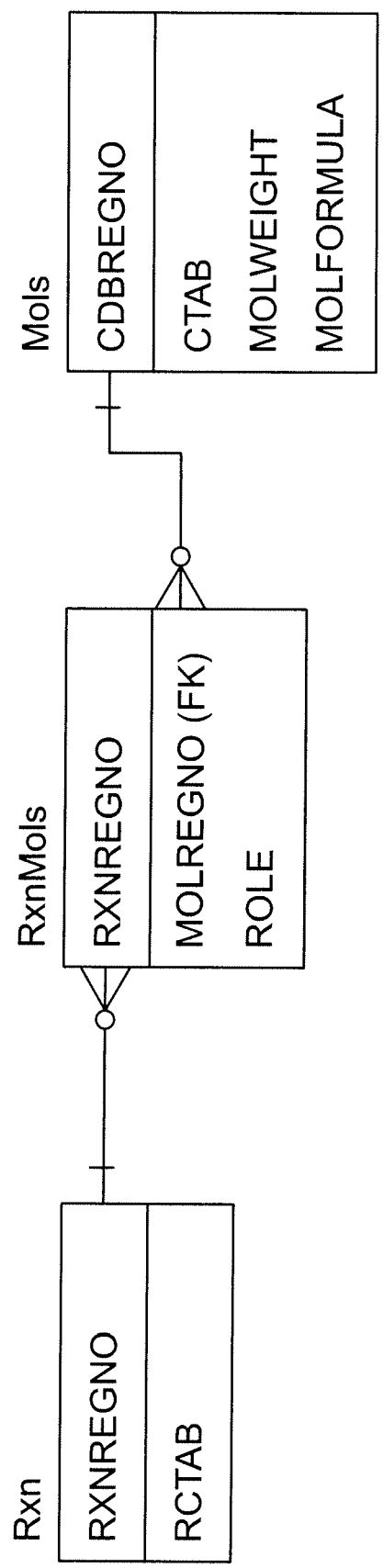
FIG. 8 shows an entity-relationship diagram that illustrates a simple reaction data model.

FIG. 8 shows an entity-relationship diagram that illustrates a simple reaction data model consisting of three tables, Rxn, RxnMols, and Mols. FIG. 8 also shows how these tables are linked by their primary and foreign keys. From this data model, users might be interested in accessing the following data: reactions, reactants, products, reactant molecules, and product molecules. Each of these can be defined as nodes in a data network, accessed by the connectors shown in FIG. 9.

Defining Reactions as the root connector, the following hierarchy can be derived from the data network:

```
RCTAB
Reactants
    CTAB
    MolWeight
    MolFormula
Products
    CTAB
    MolWeight
    MolFormula
```

Note that because the type of RctMol and PrdMol connectors is OneToOneDataConnector, their output fields are merged to their corresponding source nodes. The output fields of Reactants and Products are only used for linking, so they are hidden and do not appear in the hierarchy. Note also that the Reactants and Products connectors both link to the RxnMols table. The use of TOTABLEALIAS in these connectors allowed multiple connectors (RctMol and PrdMol) to link from the same table.

Figure 10:
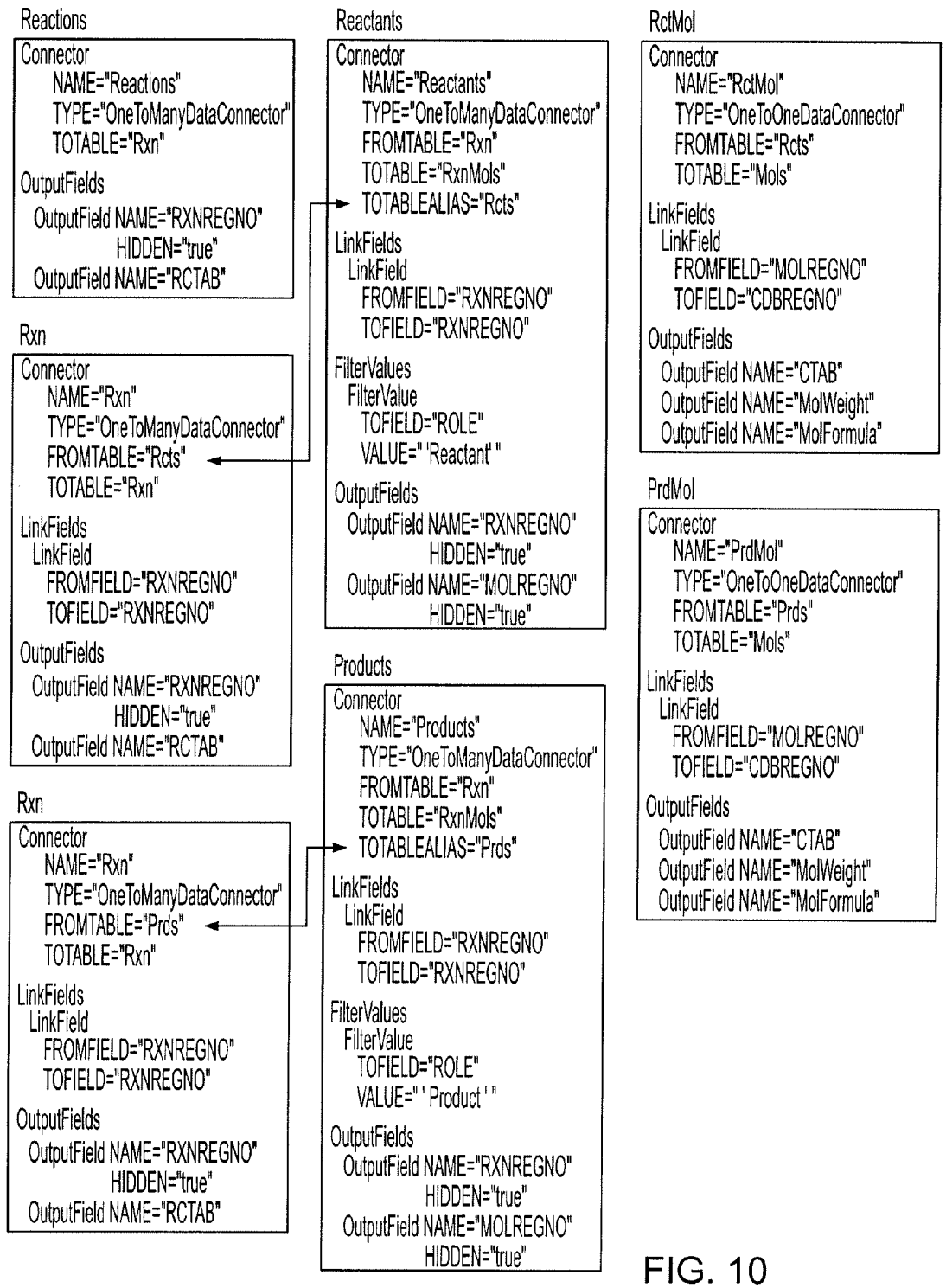
FIG. 10 shows two additional connectors added to those of FIG. 9.

The data network just described defines a single hierarchy. The power of a data network method becomes apparent when it allows connectors to be defined from leaf nodes back to the parent node. For example, one can create two new connectors that link the Reactants and Products nodes back to Rxn (see FIG. 10)

Note that the two new connectors have the same name (Rxn) and look the same. The only difference is the FROMTABLE value. One links from the Reactants connector, and the other links from the Products connector.

Using the first Rxn connector (whose FROMTABLE="Rcts"), the following alternate hierarchy can be derived:

```
Reactants
    CTAB
    MolWeight
    MolFormula
    RXN
        RCTAB
        Products
            CTAB
            MolWeight
            MolFormula
```

Using the other Rxn connector (whose FROMTABLE="Prds"), the following alternate hierarchy can be derived:

```
                Products
                    CTAB
                    MolWeight
                    MolFormula
                    RXN
                        RCTAB
                        Reactants
                            CTAB
                            MolWeight
                            MolFormula
```

Figure 11:
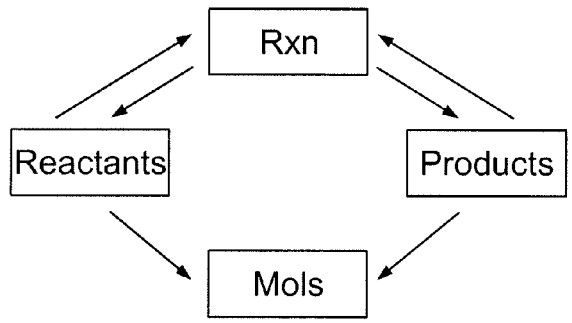
FIG. 11 shows a graphical view of a data network.

FIG. 11 shows a graphical view of the data network just created, including Rxn, Reactants, and Products as possible roots of multiple, non-static hierarchies.

Querying the Data Network

A data network can be queried using unified queries—queries written in the Unified Query Language (UQL). UQL provides common syntax for searching data sources. UQL resembles SQL.

To query a data network, SELECT the fields wanted in the hierarchy, specify the root of the data network in the FROM clause, and specify the search condition in the WHERE clause. Since a data network can have multiple hierarchies, the fields used in the SELECT and WHERE clauses determine which hierarchy to use. Starting from the root specified in the FROM clause, the connectors are followed through the network to determine a path to the specified fields. In most cases, the shortest, which is found first, is the correct one. In the case where the path is ambiguous, it is possible to specify a path to the field.

Figure 9:
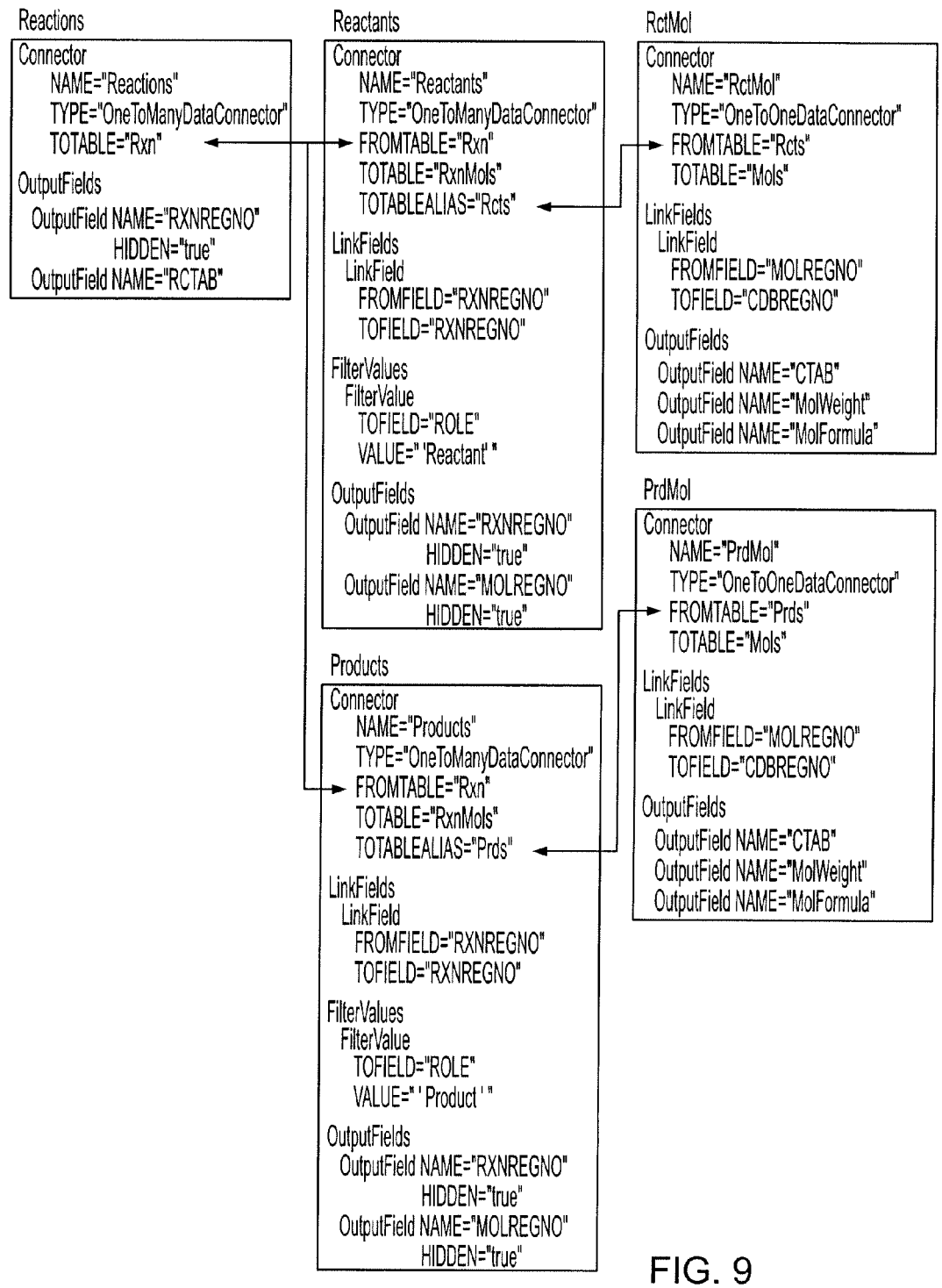
FIG. 9 shows connectors for the data model of FIG. 8.
Figure 12:
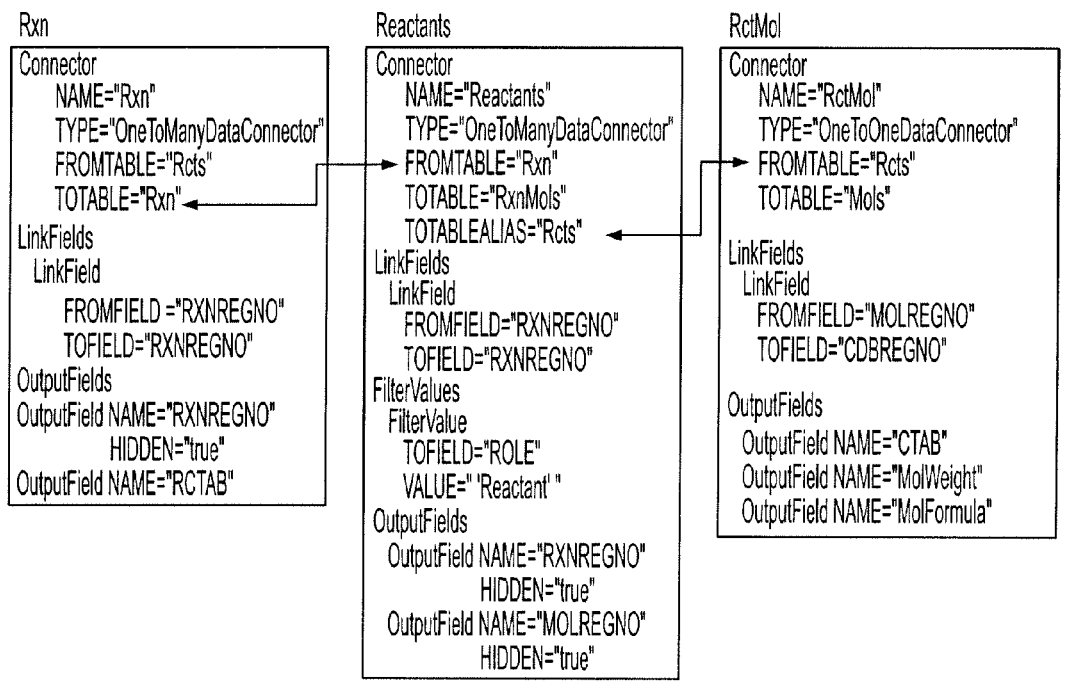
FIG. 12 illustrates a query applied to the network of FIG. 11.
Figure 13:
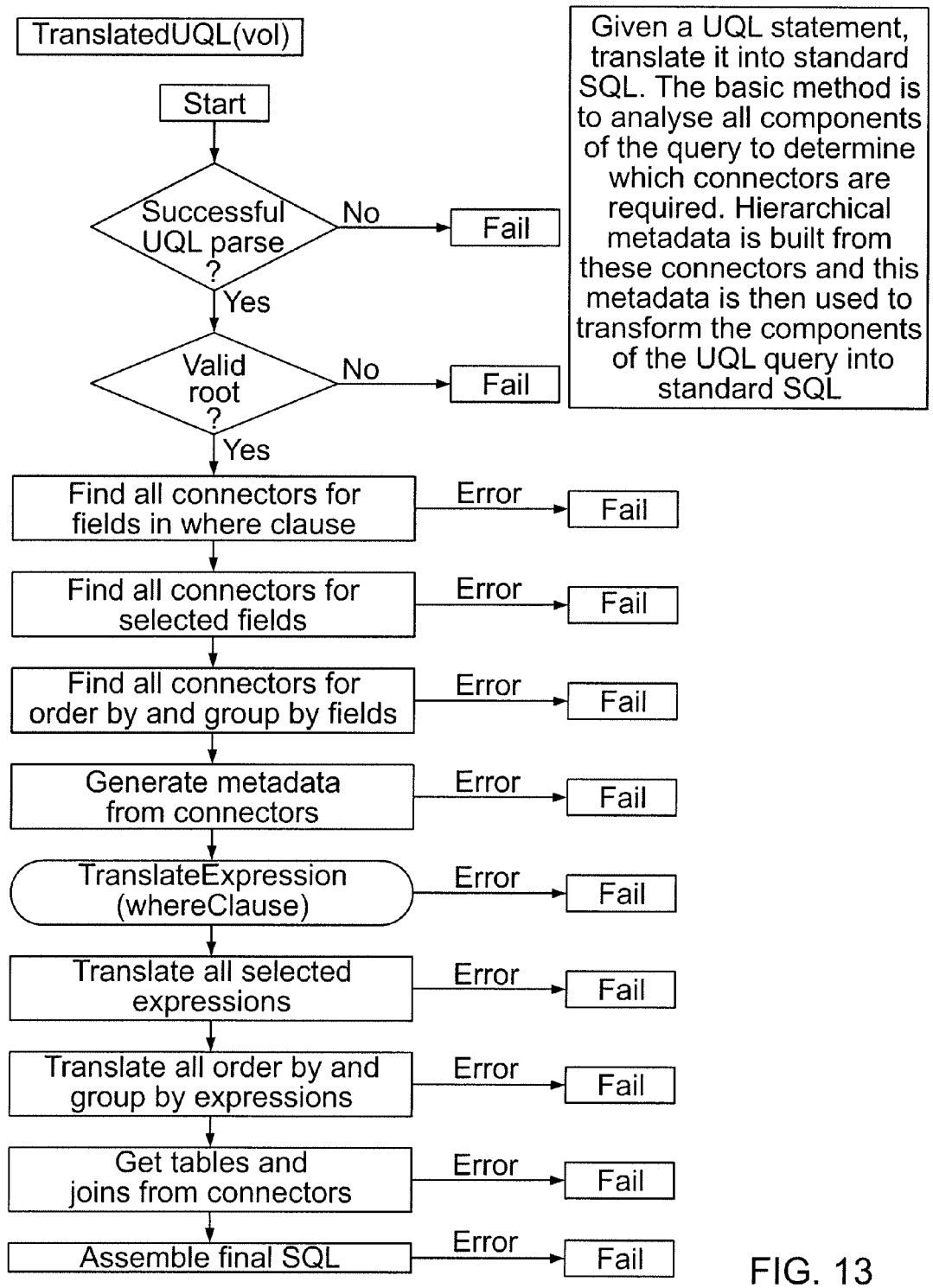
FIGS. 13-17 depict flowcharts that detail how a UQL query is translated into standard SQL.
Figure 14:
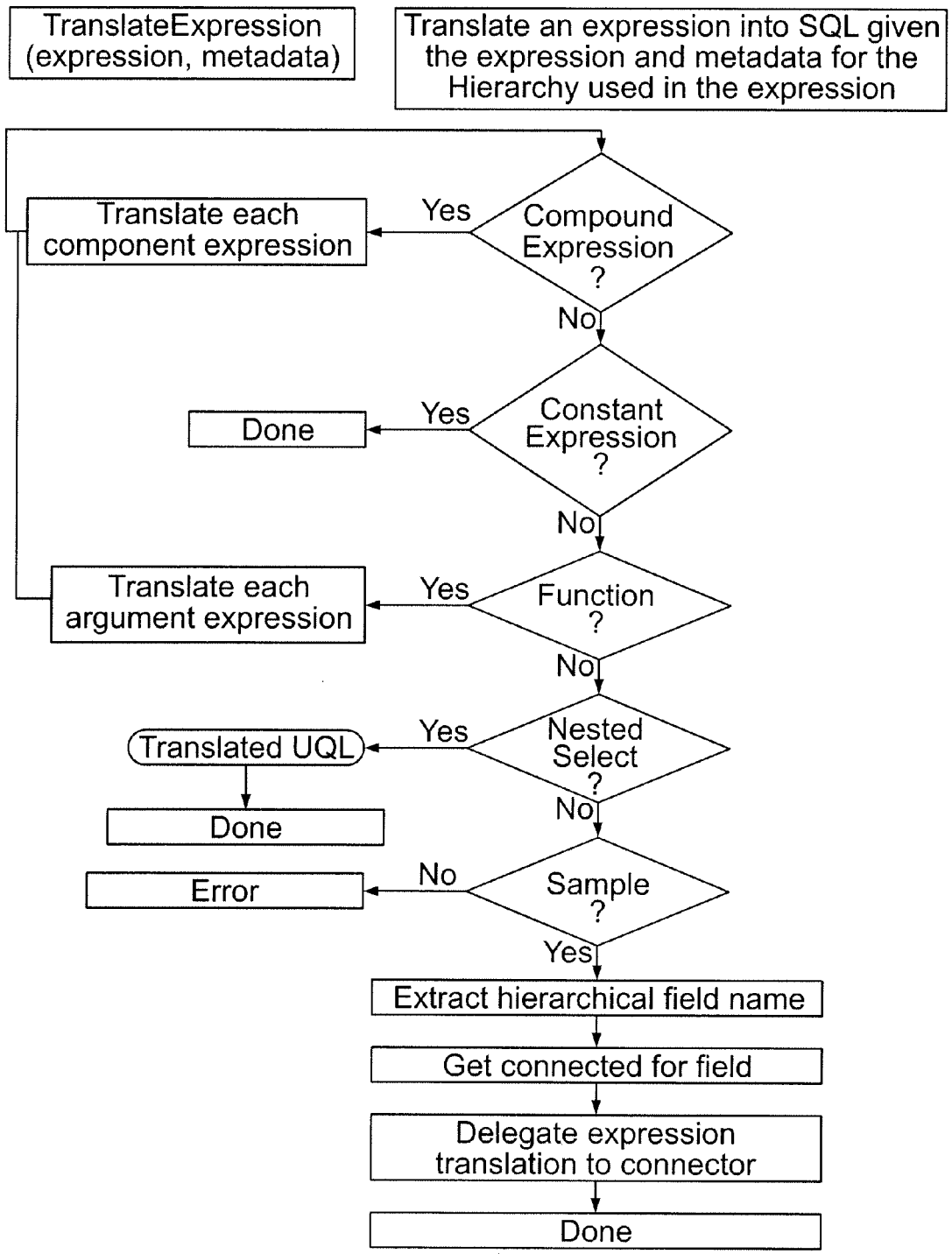
Figure 15:
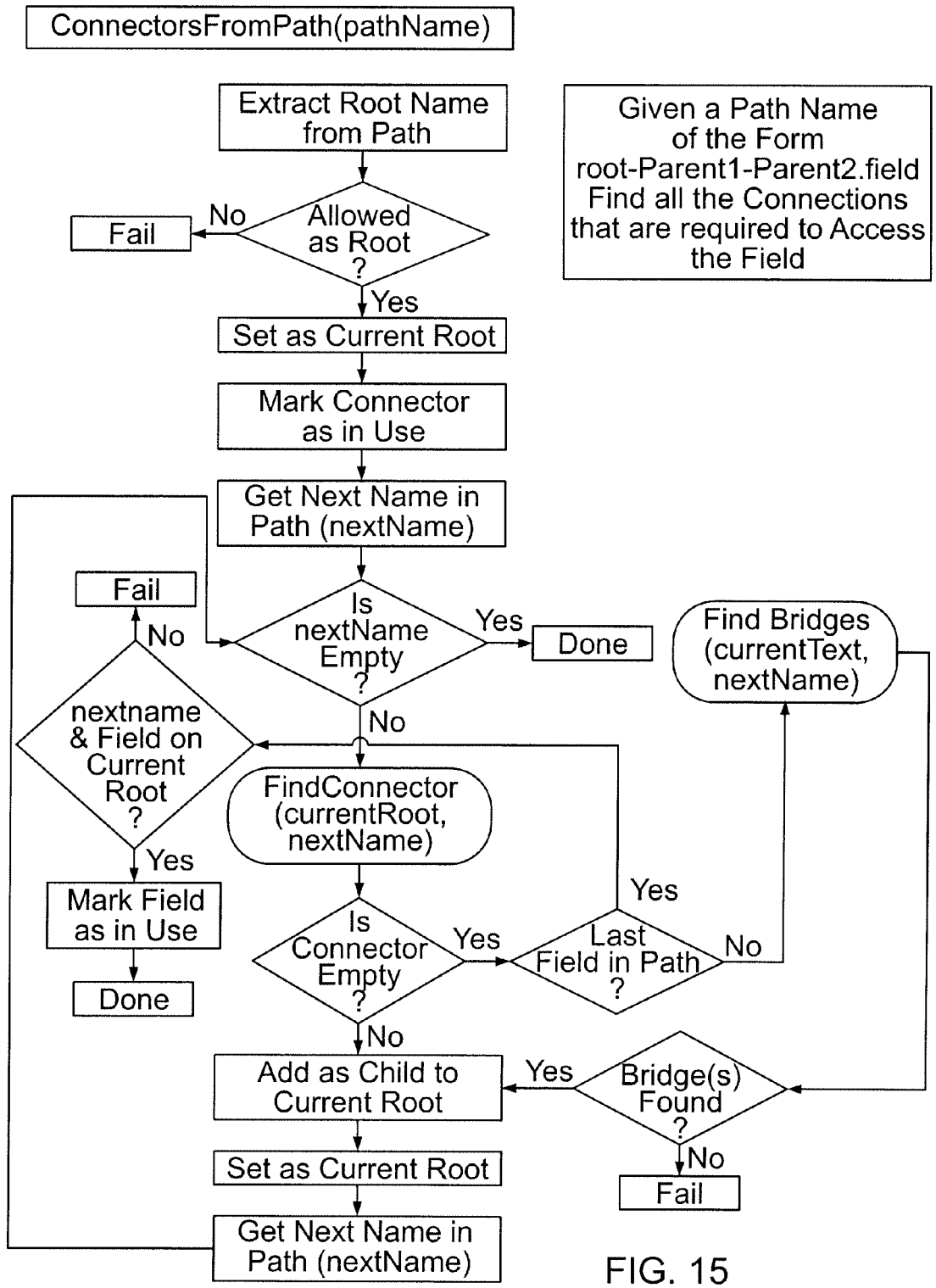
Figure 16:
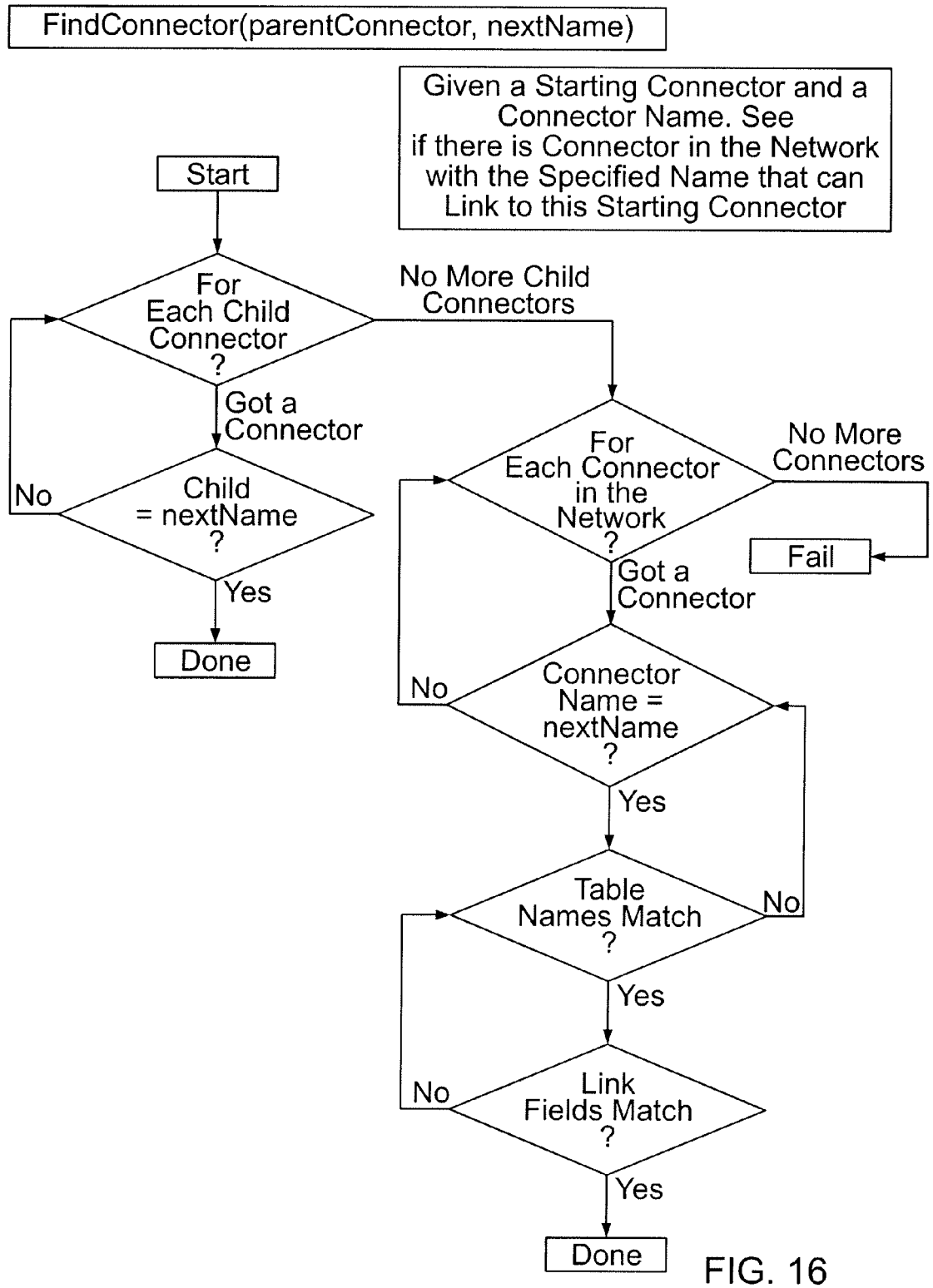
Figure 17:
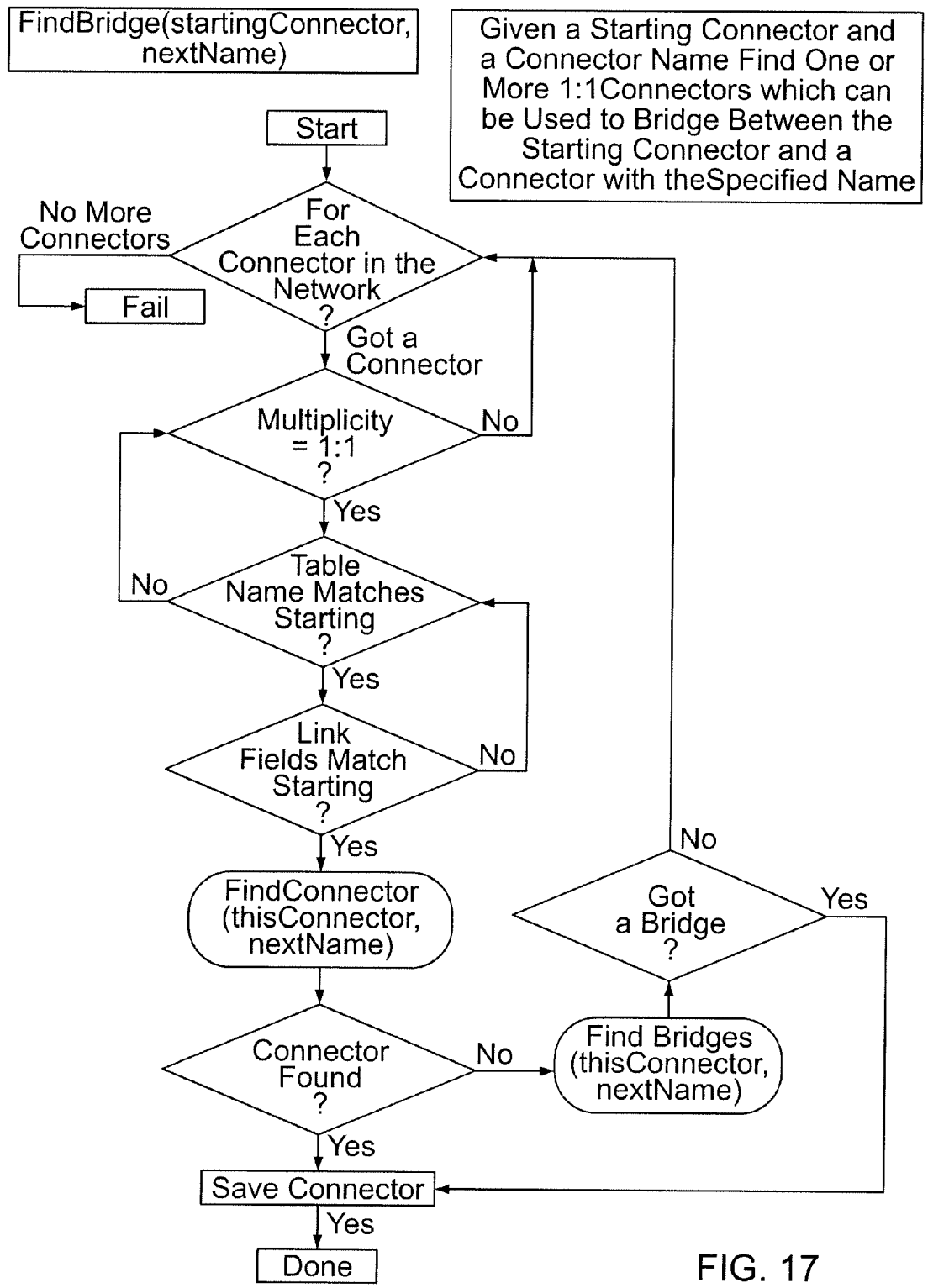

To see how fields are found in a data network, consider the data network used in conjunction with the example shown in FIGS. 8 and 9. For example, the query selects Reactants.CTAB from Rxn. The search starts at the Rxn connector. The Reactants connector is found and it can be used because its FROMTABLE value matches the TOTABLE value of Rxn and because its FROMFIELD value in the link field matches an output field of the Rxn connector. (Note that there can be multiple Reactants connectors. The first whose linkages match those of Rxn will be used.) The Reactants connector does not have the CTAB field as an output field, so the search continues. The RctMol connector is then examined; its FROMTABLE value and link field match the Reactants connector and it has the CTAB output field, so the search is finished. FIG. 12 shows the portion of the data network just described.

In this example, the CTAB field is found by examining all connectors from Reactants until one is found that has the CTAB field. There are cases, however, where it is useful to be able to specify connector paths explicitly by using the PATH attribute of the OutputField element. The PATH attribute allows the specification of a particular path to be used for a single output field.

Once a data network is described, it can be queried and data retrieved through the use of the Unified Query Language (UQL). UQL is based on SQL with extensions to support hierarchical names and chemical search functions. The select list of the SQL expression determines the shape of the hierarchy that is returned, while the where clause determines what data is returned. Since a hierarchy requires a root, this is specified as the value of the from clause. In object oriented terminology, the target of the from clause is the object questions are being asked about. The where clause is the question one wants to ask, and the select list defines the information one wants returned.

In general, the algorithm preferably used to choose the set of connectors for a particular hierarchical path such as A.B.C.leaf is as follows:

1. The root parent field and its connector must be in the list of allowed roots.

2. Any parents in the path must have a name that matches the name of a connector. For a connector named "B" to be used from connector "A", the from table of "B" must match the toTable attribute of "A". In addition, all the from link fields in "B" must be found as output fields in "A".

3. If the leaf field is found in the output fields in the final parent, the search is complete. (If this field has a PATH attribute, the specified connectors are also necessary.) If the leaf field is not found, the connectors specified in the Preferred Paths element are checked to see if the leaf field can be found there. If not, an exhaustive search is done to see whether there are any one-to-one connectors that output the leaf field and that can connect to the final parent.

Some exemplary queries and their resulting hierarchies follow:

```
select rxnchime(rctab),reactants.*,products.* from rxn
    where rss(rctab, 'query')
``` or

```
select RxnChime(rctab),reactants.*,products.* from rxn
    where sss(reactants.ctab, 'query')
returns
  Rxn
    RxnChime(RCTAB)
    Reactants
      CTAB
      MolWeight
      MolFormula
    Products
      CTAB
      MolWeight
      MolFormula
and
select *,SSS_HIGHLIGHT_CHIME(1),rxn.RxnChime(rctab) from
reactants
    where sss(ctab, 'query', 1)
returns
  Reactants
    MolWeight
    MolFormula
    SSS_HIGHLIGHT_CHIME(1)
    Rxn
    RxnChime(RCTAB)
```

Query Translation Strategies

The IDS supports at least two different strategies for translating queries into SQL: one uses joins only and the other uses joins for 1-1 relationships and in clauses for 1-many relationships. The join strategy is the default if no strategy is specified. The strategy may be specified by including a property in the property set passed to IDBStatement.setUnifiedQuery:

```
    IDBRecordSet rs = null;
    IDBUpdatePropertySet props = ds.createPropertySet( );
    ds.putProperty("QUERY_STRATEGY", (useInClause) ?
"Strategy_In": "Strategy_Join");
    IDBStatement statement = ds.createStatement( );
    if (!ds.setUnifiedQuery(query, props)) {
        // Handle the error
```

```
        } else {
            System.out.println("Translated query: " +
    statement.getTranslatedQuery( );
                rs = statement.executeQuery( );
        }
```

Building an IDS Data Network from a Relational Data Model

Although IDS is not, in a preferred embodiment, an object-oriented database, it is useful to analyze a data model from an object perspective when building a network of IDS connectors to expose that data model.

Preferred steps in building such a network comprise the following:

1. Analyze the data model to decide what "objects" are to be exposed. Objects are typically well-defined entities that can be simply described (e.g., employee, chemical structure, batch information, etc.). They are usually embodied in one or more tables, with one containing the primary data or at least the primary key for each object. These objects often become the roots of hierarchies derived from the network.

2. Analyze the inheritance tree of these objects. Some data models make heavy use of generic descriptions differentiated by the data content. IDS allows such models to be handled by defining a low level object, which is then extended to separately identify specific object types. A typical example comes from reaction data models, where reactants, products, catalysts, etc. are all specific instances of a lower level chemical structure definition. In the IDS, a definition of this chemical structure can be easily extended to support the specific definitions of each of the components.

3. Analyze the relationships of each of these objects to each other. This analysis includes multiplicity (one-to-one, one-to-many) and reciprocal relationships (employee to manager, manager to employee).

4. Define connectors for each of these objects such that all the relevant data is exposed in a hierarchy logical for the object. Try to create each set of connectors as an independent, self-contained subnetwork. Each object should have a single root connector, which provides an entry point to the subnetwork. Other connectors link to this connector by appropriate values for the fromTable and toTable attributes and linkFields.

5. Modify the connectors for each of the subnetworks to reflect the relationships between the objects in the network. This is done by specifying fromTable and toTable attributes and link fields. If an object has relationships with more than one other object, a single root connector can be extended multiple times to reflect these relationships.

6. Optimize and tune the network by adding connectors that transform data (PivotConnector) and that integrate data from external sources (DataSourceConnector). As needed, based on performance behavior, change some connectors to use deferred retrieval.

FIGS. 13-17 depict flowcharts that detail how a UQL query is translated into standard SQL. The basic approach is that the query is parsed into its basic components and each of these components is analyzed to determine what connectors are required. These connectors are then used to create hierarchical metadata as defined by the query. This metadata is used to translate the components of the UQL. The connectors themselves provide the tables and joins necessary for the execution of the query.

Further Embodiments

One alternate embodiment is primarily focused on relational data. Data from non-relational sources (Hview, XML, etc.) may be integrated into the data network with some limitations.

First, the connection to the non-relational data source is to the root of its hierarchy. For example, Beilstein data can be included but only connected via the root of the Beilstein hierarchy.

Second, non-relational data must be a terminal node in the data network. This follows from the first point since connections can made to the root only. For non-relational data to function in the middle of a hierarchy, a connection from lower level data would be required.

Third, non-relational data cannot function as the root of any derived hierarchy. This follows from the second item.

Despite these limitations, integration of non-relational data is quite usable. For example, Beilstein (an information system of organic chemistry with millions of chemical data reports and reactions) could be connected under ACD (Available Chemicals Directory) software to allow transparent retrieval of Beilstein data for any ACD entry. Note also that the IDS itself can be treated as a non-relational source so that any existing IDS network can be connected to another by a single point.

Accessing the IDS

The IDS preferably is accessed like any other data source. It may be defined as a new type of data source and created as either a named, initialized instance or an unnamed instance that needs to be supplied with initialization XML.

Initialization XML

The connectors that describe a data network preferably are defined using XML that is included in the initialization XML for the IDS. The skeleton of the IDS initialization looks like this:

```
    <DataSource>
      <Connection>
        <ConnectionAttributes SOURCENAME="MyOracleDataSource"/>
        <Roots>
          <Root NAME="Rxn">
            <Hierarchy NAME="RxnRoot"
    SELECT_LIST="*,reactants.*,products.*"/>
          </Root>
          <Root NAME="Reactants"/>
          <Root NAME="Products"/>
          ...
        </Roots>
        <PreferredPaths>
          <PreferredPath PATH="RctMol"/>
          ...
        </PreferredPaths >
        <Connectors>
          <Connector ... />
          <Connector ... />
          ...
        </Connectors>
      </Connection>
      <Properties>
        <Property NAME="foo" VALUE="bar"/>
        <Property NAME="bar" VALUE="foo"/>
        ...
      </Properties>
    </DataSource>
```

The ConnectionAttributes element specifies the name of a relational data source that provides the connection to the data the IDS operates on. The Roots element contains a list of Root elements, each of which specifies the name of an allowed root in the hierarchy. The Properties element allows global properties of the data source to be set.

| Element | Required? | Definition |
|---|---|---|
| ConnectionAttributes | Yes | Specifies the name of the relational data source that contains the data to be integrated. |
| Roots | Yes | A list of the allowed roots of derived hierarchies. There must be at least one allowed root specified. |
| Initializer | No | Contains the name of a Java class that will do initialization |
| Properties | No | Contains a list of properties as name/value pairs |
| Connectors | Yes | Contains a list of connector definitions |

The ConnectionAttributes Element

The ConnectionAttributes element specifies the name of a relational data source that provides the connection to the data the IDS operates on.

| Element | Attribute | Required? | Definition |
|---|---|---|---|
| ConnectionAttributes | SOURCENAME | Yes | The name of a relational data source data source that contains the objects being referenced. |

The Roots Element

The Roots element specifies which connectors are allowed as the root of a derived hierarchy. (One can also think of this as specifying the kinds of objects that can be retrieved.) It contains a collection of Root elements, each of which specifies a single connector. As a convenience in querying, each root connector can also specify one or more named predefined hierarchies. These hierarchies can then be referenced by their name in the FROM clause of a UQL statement. For example, in the XML above the UQL:

select * from RxnRoot where . . . .

would be expanded to:

select *,reactants.,products.* from Rxn where . . . .

Note that when a predefined hierarchy is used, * must be the only item in the select list.

| Element | Parent | Attribute | Required? | Definition |
|---|---|---|---|---|
| Root | Roots | NAME | Yes, if ID is not specified | The name of a connector which is an allowed root |
| Root | Roots | ID | Yes, if NAME is not specified | The ID of a connector which is an allowed root |
| Hierarchy | Root | NAME | Yes | The NAME of the predefined hierarchy. The element's value contains the select list which should be used when this hierarchy is specified in the FROM clause. |
| Hierarchy | Root | SELECT_LIST | Yes | The select list which should be used when this hierarchy is specified in the FROM clause. |

It is preferred not to specify both a NAME and ID for the root element.

The Initializer Element

The Initializer element specifies the name of a Java class that implements the IIDSInitializer interface (discussed below). After all other configuration information is processed and any specified connectors are created, this class is instantiated and the interface used to retrieve additional configuration XML.

| Element | Attribute | Required? | Vocabulary | Definition |
|---|---|---|---|---|
| Initializer | NAME | Yes | Fully qualified Java class | The name of a Java class that implements the IIDSInitializer interface. |

The Connectors Element

Connectors can be classified by the kind of data they connect (tables, data sources, calculations, etc.), their multiplicity (one-to-one or one-to-many), whether they retrieve data immediately or only on request, how they are linked (by field values or SQL statements), and whether they create a parent field in the resulting hierarchy. No matter what the specifics of a particular connector, they preferably all share the same basic XML structure:

```
<Connector
    NAME="foo"
    ID="bar"
    TYPE="OneToManyDataConnector"
    FROMTABLE="fromAlias"
    TOTABLE="toTableName"
    TOTABLEALIAS="toAlias">
    <LinkFields>
        <LinkField FROMFIELD="sourceFieldName" TOFIELD="toFieldName"/>
        ...
    </LinkFields>
    <FilterValues>
        <FilterValue TOFIELD="toFieldName" VALUE="abc"/>
        <FilterValue TOFIELD="toFieldName2">
            <Value>def</Value>
            <Value>ghi</Value>
            ...
        </FilterValue >
        ...
    </ FilterValues >
    <OutputFields>
        <OutputField NAME="Geek" ALIAS="Nerd" PATH="NerdFromGeek"/>
        ...
    </OutputFields>
    <Properties>
        <Property NAME="PropName" VALUE="PropValue/>
```

-continued

```
        ...
    </Properties>
</Connector>
```

| Element | Attribute | Required? | Definition |
|---|---|---|---|
| Connector | NAME | Yes, if this connector does not EXTEND another | The name of the connector. For connectors that create a parent, this name will be the name of the parent field in the derived hierarchy. For connectors that don't create a parent, this name is used internally and doesn't appear in a derived hierarchy. Since a given parent might be created by different connectors, the name does not need to be unique. (For example, in the reaction hierarchy example, there were two Rxn connectors, one connecting Reactants and the other Products to the Rxn table.) |
| | ID | In some cases | A unique identifier for a given connector. The ID value is used to identify a connector to be extended or specified as an allowed root. (If a connector is extended, it is required to have an ID.) |
| | TYPE | Yes, unless the connector extends another | The type of connector (OneToManyDataConnector, PivotingConnector, etc. See below.) The use of the EXTENDS and TYPE attributes are mutually exclusive. |
| | EXTENDS | No | The ID of a connector that is to be extended. All of the attributes and subelements of the base connector are inherited. All can be overridden (except for the TYPE attribute). The use of the EXTENDS and TYPE attributes are mutually exclusive. |
| | FROMTABLE | No | The table from which the connection is to be made. This may be a real table name or a table alias. |
| | TOTABLE | No | The table or view to which the connection is made. May be a SQL statement but in this case a value for TOTABLEALIAS must be provided. Not required if this connector is used as the basis of others that do specify the attribute. |
| | TOTABLEALIAS | No | The alias to use for the table to which the connection is made. |
| | VALIDATION | No | Action to take when validation fails. If not specified, FAIL is assumed. ELIMINATE Discard connector FAIL Data source initialization fails |

Notes on Connector XML:
1) When a connector is created by extending another, all attributes and subelements may be overridden except the actual connector type. When a subelement such as LinkFields is overridden, the inherited value is completely replaced. The exception to this is the Properties element where the properties are merged.
2) The use of TOTABLEALIAS allows multiple connections to be made to the same table, such as with the Reactants and Products connectors in the example above.
3) A table in another instance of Oracle (for example) preferably can be referenced through the use of db links and synonyms.
4) References to fields in the generated SQL are qualified to the containing table (or table alias).
5) When using connectors with the same TOTABLE entry in two separate branches under a parent, there is separate connector definition for each branch with a different TOTABLEALIAS entry. This is in order to pose queries that involve both connectors simultaneously. (Without different aliases, there could be ambiguous references to fields.)
6) If there are multiple connectors with the same name, only one of them may be a root and it must be identified in the Roots section by its ID.

The LinkField Element

The LinkField element contains a list of linking fields. Each LinkField element has two attributes that specify the names of the from and to fields.

| Element | Attribute | Required? | Definition |
|---|---|---|---|
| LinkField | FROMFIELD | Yes | The name of the field in the source data. |
| | TOFIELD | Depends on the connector | The name of the field in the connected data. This will be absent in the Select connectors. |

-continued

| Element | Attribute | Required? | Definition |
|---|---|---|---|
|  | FLEXMATCH | Yes, if linking on structure | The options to use in the flexmatch function when the link field is chemical structure |

Notes on LinkField XML:
1) The name of the FROMFIELD is used as the left hand field in a join qualified by either the FROMTABLE or FROMTABLEALIAS.
2) The name of the TOFIELD is used as the right hand field in a join qualified by either the TOTABLE or TOTABLEALIAS.

Example

```
<LinkFields>
    <LinkField FROMFIELD="RIREGNO" TOFIELD="RIREGNO"/>
    <LinkField FROMFIELD="CDBREGNO"
       TOFIELD="MOLREGNO"/>
</LinkFields>
```

The FilterValues Element

The FilterValues element contains a list of filtering values. Each FilterValue element must have at least a TOFIELD attribute which specifies the field in the connected data to be queried. For a single filter value, each FilterValue element also has a Value attribute. Alternatively, multiple values may be specified by multiple Value elements, each containing a single value.

| Element | Parent | Attribute | Required? | Definition |
|---|---|---|---|---|
| FilterValue | FilterValues | TOFIELD | Yes | The name of the field in the connected data. |
|  |  | VALUE | No | The value to be used in the query. |
| Value | FilterValue |  |  | The element value specifies a value to be linked. |

| Element | Parent | Attribute | Required? | Definition |
|---|---|---|---|---|
|  |  |  |  | Multiple elements are combined to create an "in" clause. |

Examples

```
<FilterValues>
    <FilterValue TOFIELD="ROLE" VALUE="Reactant"/>
</FilterValues>
<FilterValues>
    <FilterValue TOFIELD="ROLE">
        <Value>Reactant</Value>
        <Value>Product</Value>
        <Value>Reagent</Value>
    </FilterValue>
</FilterValues>
```

The OutputField Element

The OutputFields element contains a list of OutputField elements, each of which specifies a single field to be output. As a shortcut, the SELECT_ALL attribute may be set on the OutputFields element; this will cause all fields in the connected table to be output. (This list may be edited using the REMOVED/HIDDEN attributes described below.)

| Element | Attribute | Required? | Vocabulary | Definition |
|---|---|---|---|---|
| OutputFields | SELECT_ALL | No | true false | If true, all fields in the connected data are output. |
| OutputField | NAME | Yes | Actual field name | The may be a column name in the connected table or a SQL function call. |
|  | ALIAS | No | Desired name | The alias to use for this field. If provided, all references to this field are via this name. |
|  | HIDDEN | No | true false | If true, the field is not visible in any returned recordsets. Can be used with SELECT_ALL = "true" to hide fields from output. This is useful when a field is used in linkages but should not be visible to applications. |
|  | REMOVE | No | true false | Can be used in conjunction with SELECT_ALL = "true" to prevent retrieval of this field in the generated SQL. |
|  | SEARCHABLE | No | true false | If false, field is not searchable; true is assumed if absent. |
|  | TYPE | No | Integer Double | The type of the data. This is required if the output field is a |

| Element | Attribute | Required? | Vocabulary | Definition |
|---------|-----------|-----------|------------|------------|
| | | | VariableText Structure Reaction Binary | function or returned by a SQL statement. If the value of TYPE is "Structure" or "Reaction" the corresponding MOLFORMAT/RXNFORMAT attribute must also be set. |
| | ISFUNCTION | No | true false | Must be present and set to true if the output field is a function. |
| | PATH | No | Connector path | Specifies a connector path for accessing the data. For example, in the reaction example above, the CTAB output field in the Reactants connector would have been specified with a PATH attribute of "Mol". |
| | WRAPPER | No | Java class | Specifies a fully qualified Java class which extends FieldWrapper. This can be used to provide interfaces to binary fields. |

Notes on OutputField XML:
1) A field with a PATH attribute must have a one-to-one data relationship. Depending on the connector(s) used to access the field, its retrieval may be either immediate or deferred. The advantage to specifying a field with a PATH attribute is that it is automatically incorporated into the output fields of the connector. For example, in the reaction data model above, the CTAB field is in the MOL table. If the CTAB field is specified in the Reactants/Products connectors with a PATH attribute, specifying Reactants.* or Products.* will automatically incorporate the CTAB into the derived hierarchy. Without the PATH attribute, the CTAB field would have to be included in the select list using Reactants.CTAB.
2) The value of the PATH attribute may be a dot-separated path of multiple connectors.
3) A simple shortcut when most, if not all fields, in a table are desired for output is to use the SELECT_ALL attribute in conjunction with the REMOVE and HIDDEN attributes. See the examples below.
4) The value of NAME will be used in the select portion of the SQL statement qualified by either TOTABLEALIAS or TOTABLE if there is no alias specified.
5) If a function is used for a NAME, the function arguments must already be qualified with respect to the proper table references.
6) Other properties specified on the OutputField element would be reproduced on the corresponding field in the resulting metadata.

Examples

```
<OutputFields>
   <OutputField NAME="ROLE" ALIAS="MyRole"/>
   <OutputField NAME="CTAB" PATH="Mol"/>
</OutputFields >
< OutputFields SELECT_ALL="true">
```

-continued

```
      <OutputField NAME="KeyField" HIDDEN="true"/>
      <OutputField NAME="InternalField" REMOVE="true"/>
   </OutputFields >
   <OutputFields>
      <OutputField NAME="CTAB"/>
      <OutputField NAME="CASNumber"
PATH="LookupTable.CASNumber"/>
      <OutputField NAME="CHIME(CTAB)" ALIAS="Chime"
ISFUNCTION="true"
               TYPE="VariableText"/>
   </OutputFields >
```

The OrderByClause Element

The OrderByClauses element contains a list of OrderBy-Clause elements, each of which specifies a single field to be used in sorting when data is retrieved using this connector as a subparent. (Sorting at the root level must be done by specifying the "order by" clause in the query.)

| Element | Attribute | Required? | Vocabulary | Definition |
|---------|-----------|-----------|------------|------------|
| OrderByClause | | No | | Contains one or more OrderByClause elements |
| OrderByClause | FIELD | Yes | A name of a field as specified in an OutputField element. | The name of the field to be used in the sort. This should be the field without a table name qualifier. |
| OrderByClause | DIRECTION | Yes | asc, desc | The direction of the sort. |

Examples

```
<Connector NAME="SysText"
CONNECTOR="OneToManyDataConnector"
          FROMTABLE="RXNINST" TOTABLE="SYSNO">
   <LinkFields>
     <LinkField FROMFIELD="RIREGNO" TOFIELD="RIRegno"/>
   </LinkFields>
```

```
<OutputFields>
    <OutputField NAME="SYSNO" HIDDEN="true"/>
    <OutputField NAME="SYSTEXT" PATH="SysNoToSysText"/>
</OutputFields>
<OrderByClauses>
    <OrderByClause FIELD="SYSTEXT.SYSTEXT" DIRECTION="asc"/>
```
```
    </OrderByClauses>
</Connector>
```

The Property Element

The Properties element contains a list of Property elements which affect the operation of the connector. Some properties can also be set on the data source to set a global value. (This global value is overridden by any connector specific value.)

| Property Name | Property Value | Connector? Datasource? | Definition |
|---|---|---|---|
| USEDISTINCT | true false | Both | If true, the distinct operator is used on all SQL statements created by this connector. |
| USE_SELECT_ALL | true false | Both | If true, "select *" is used for all SQL statements created by this connector instead of listing individual fields. This will be ignored if any output fields specify an alias. |
| FILTER | true false | Both | If true, all data retrieved from this connector will be filtered with respect to the query. |
| SEARCH_JOIN_TYPE | RightOuter LeftOuter EquiJoin | Connector | The type of join to use for all searches and retrieves created by this connector. If absent, an equijoin is used. |
| DEFERANCILLARYFUNCTIONS | true false | Connector | If true, ancillary cartridge functions like SSS_HIGHLIGHT_CHIME are deferred when on root level fields. (Due to the nature of the cartridge, they are automatically deferred when on fields of subparents.) |
| CALCULATORCLASS | Java class name | Connector | Only required for the CalculatorConnector. Specifies the Java class which does the calculation. |
| SELECTCOMMENT | An Oracle comment | Connector | Specifies a default comment to be used queries. Can be overridden by comments specified explicitly in UQL. |
| FROMCOMMENT | An Oracle comment | Connector | Specifies a default comment to be used. Can be overridden by comments specified explicitly in UQL. |
| WHERECOMMENT | An Oracle comment | Connector | Specifies a default comment to be used. Can be overridden by comments specified explicitly in UQL. |
| Debug Properties | | | |
| PRINT_SEARCH_TIME | true false | Datasource | Debug only. Prints the elapsed time for search execution. |
| PRINT_QUERY_METADATA | true false | Datasource | Debug only. Prints metadata for all fields involved in query and retrieval. |
| PRINT_RETRIEVE_SQL | true false | Datasource | Debug only. Prints all SQL used for data retrieval. |
| PRINT_TRANSLATED_QUERY | true false | Datasource | Debug only. Prints the native SQL query resulting from UQL translation. |
| PRINT_QUERY_CONNECTORS | true false | Datasource | Debug only. Prints all connectors and their usage flags after a query is analyzed. |
| PRINT_SECONDARY_QUERIES | true false | Datasource | Debug only. Prints all queries used internally to implement functionality. |
| PRINT_ROOT_CONNECTOR | true false | Datasource | Debug only. Prints the root connector and all its children after analyzing the query |

Specifying Connectors

Connectors come in a variety of flavors. In some cases, a connection will result in multiple records that create a hierarchy. In others, fields from multiple sources are integrated into a single record. Sometimes a field is rarely retrieved so it is best to defer retrieval until a value is requested. Each of these scenarios can be handled by a specific connector. A table of preferred connectors and their basic characteristics follows:

| Connector Type | Multiplicity | Deferred Retrieval? | Linkage type | Creates Parent Field? |
|---|---|---|---|---|
| OneToManyDataConnector | One to many | Yes | Field values | Yes |
| OneToOneDataConnector | One to one | No | Field values | No |
| OneToOneParentConnector | One to one | Yes | Field values | Yes |
| OneToOneDeferredConnector | One to one | Yes | Field values | No |
| PivotConnector | One to many | Yes | Field values | Yes |
| ExistenceConnector | One to many | Yes | Field values | Yes |
| CalculatorConnector | One to one | Yes | Field values | No |
| DataSourceConnector | One to many | Yes | Field values | Yes |

Connector Specifics

For the examples in the following description, assume a data model that looks like this:

TABLE 1

PrimaryKey_1
Field1
    Field11
    Field22

TABLE 2

PrimaryKey_2
ForeignKey_1
ForeignKey_3

TABLE 3

PrimaryKey_3
CTAB    Field2
MolWeight
MolFormula and a connector for Table1 that looks like this:

```
<Connector NAME="Root" TYPE="OneToManyDataConnector"
TOTABLE="Table1">
    <OutputFields>
      <OutputField NAME="Field1"/>
      <OutputField NAME="Field2"/>
      <OutputField NAME="PrimaryKey_1" HIDDEN="true"/>
    </OutputFields>
</Connector>
```

It is assumed that Root is an allowed root of the hierarchy and is an entry point into the data network. (This connector defines access to Table1 only.

OneToManyDataConnector

This connector links two relational tables with a one-to-many relationship with the linked data under a parent field. Retrieval is deferred until requested. The connector definition would look like this:

```
<Connector NAME="Table2Parent"
      TYPE="OneToManyDataConnector"
      FROMTABLE="Table1" TOTABLE="Table2">
    <LinkFields>
      <LinkField FROMFIELD="PrimaryKey_1"
TOFIELD="ForeignKey_1"/>
    </LinkFields>
```

-continued

```
    <OutputFields>
      <OutputField NAME="Field11"/>
      <OutputField NAME="Field22"/>
      <OutputField NAME="ForeignKey_3" HIDDEN="true"/>
    </OutputFields>
</Connector>
```

The resulting metadata would look like this:

Field1
Field2
Table2Parent
    Field11
    Field22

OneToOneDataConnector

This connector links two relational tables with a one-to-one relationship with the linked data, flattened into the same level of the hierarchy as the source data. Retrieval is done at the same time data is retrieved for the source data. The connector definition would look like this:

```
<Connector NAME="Table2_3Link"
      TYPE="OneToOneDataConnector"
      FROMTABLE="Table2" TOTABLE="Table3">
    <LinkFields>
      <LinkField FROMFIELD="ForeignKey_3"
TOFIELD="PrimaryKey_3"/>
    </LinkFields>
    <OutputFields>
      <OutputField NAME="CTAB"/>
      <OutputField NAME="MolWeight"/>
      <OutputField NAME="MolFormula"/>
    </OutputFields>
</Connector>
```

Combining this connector with the Root and Table2Parent connectors, the resulting metadata would look like this:

Field1
Field2

```
Table2Parent
    Field11
        Field22
        CTAB
        MolWeight
        MolFormula
```

Note that the Table2_3Link connector does not create a parent.

OneToOneDeferredConnector

This connector is identical to the OneToOneDataConnector except that the data is not retrieved until requested. The resulting metadata is identical.

OneToOneParentConnector

This connector is identical to the OneToOneDataConnector except that it creates a parent field even though the multiplicity is one to one. This can be useful to clarify data relationships. There will be at most a single record in the recordset from the parent field. The name of the parent is the name of the connector.

PivotConnector

This connector extends the functionality of the OneToManyDataConnector by allowing pivoting of the data transparently. If the pivoted columns are declared in the XML Pivoted Fields element, querying can be done over the pivoted structure and translated automatically by the connector. The configuration of this connector specifies all the information necessary to create the unpivoted recordset in a form identical to the OneToManyDataConnector and adds additional information under the PivotParams element which specifies how the pivot should be done. The contents of the PivotParams element is identical to that of the PivotRecordset with the addition of the Pivoted Fields element.

The contents of the Pivoted Fields element is in the standard metadata format from the XDfile. The fields must define the columns that will result from the pivoting operation. Each field specification must include a type consistent with the its pivoted data. Aliased fields are specified with the alias as the value of the NAME property and the actual column name in the NATIVENAME property.

```
<Connector ID="PropertiesBase" CONNECTOR="PivotConnector"
        FROMTABLE="CIRX9701_M2_RXNMOL"
        TOTABLE="CIRX9701_M2_RXNMOL">
    <LinkFields>
        <LinkField FROMFIELD="RIRegno" TOFIELD="RIRegno"/>
        <LinkField FROMFIELD="MolRegno" TOFIELD="MolRegno"/>
    </LinkFields>
    <OutputFields>
        <OutputField NAME="MolRegno"/>
        <OutputField NAME="PROP_NAME"/>
        <OutputField NAME="PROP_TEXTVAL"/>
        <OutputField NAME="PROP_NUMVAL"/>
        <OutputField NAME="PROP_NUMVAL_LO"/>
    </OutputFields>
    <Properties>
        <Property NAME="FILTER" VALUE="false"/>
    </Properties>
    <PivotParams>
        <IndexFields>
            <Field>Molregno</Field>
        </IndexFields>
        <FieldsToPivot>
            <Field>PROP_NAME</Field>
        </FieldsToPivot>
        <ValuesToPivot>
            <SelectiveValueFields>
                <SelectiveValueField default="true">
                    PROP_NUMVAL
                </SelectiveValueField>
                <SelectiveValueField>
                    PROP_TEXTVAL
                    <PivotFieldName>grade</PivotFieldName>
                </SelectiveValueField>
            </SelectiveValueFields>
        </ValuesToPivot>
        <PivotedFields>
            <MetaData>
                <FieldDef NAME="cs" TYPE="Double"/>
                <FieldDef NAME="de" TYPE="Double"/>
                <FieldDef NAME="ds" TYPE="Double"/>
                <FieldDef NATIVENAME="ee" NAME="EnantExcess" TYPE="Double"/>
                <FieldDef NAME="yield" TYPE="Double"/>
                <FieldDef NAME="grade" TYPE="VariableText"/>
            </MetaData>
        </PivotedFields>
    </PivotParams>
</Connector>
```

CalculatorConnector

This connector allows custom calculators to be used within a data network. It extends the OneToOneDeferredConnector so that if a calculation returns multiple values, they must be delivered in multiple fields. (Note that simple calculations can be done with UQL itself.) The actual calculation is carried out by a Java class that implements the IIDSCalculator interface (discussed below). For example,

```
<Connector NAME="Calc" CONNECTOR="CalculatorConnector"
    FROMTABLE="ABC">
    <LinkFields>
        <LinkField FROMFIELD="FieldUseInCalc_1"/>
        <LinkField FROMFIELD="FieldUseInCalc_2"/>
    </LinkFields>
    <OutputFields>
        <OutputField NAME="CalcValue1" TYPE="Double"/>
        <OutputField NAME="CalcValue2" TYPE="VariableText"/>
    </OutputFields>
    <Properties>
        <Property NAME="CALCULATORCLASS" VALUE="com.xyz.Calculator"/>
    </Properties>
</Connector>
```

Note that the link fields should specify any fields in the parent connector used by the calculation since this will guarantee that they are retrieved. Any fields retrieved for the calculation will not be hidden since they need to be accessible to the calculation implementation. Since no linkage is actually performed, no TOFIELD attribute is required. Each OutputField element should specify the data type returned by the calculation. Note that a single calculator implementation can return multiple values in multiple fields. The class which implements the calculator interface (IIDSCalculator) is specified in the CALCULATORCLASS property.

DataSourceConnector

This connector allows hierarchies from other data sources to be included in a derived hierarchy. UQL search expressions can be used to search fields across both the external hierarchy and the IDS hierarchy. The external data source is accessed as a single, fixed hierarchy. Since the searches of these external data sources must be driven to completion, there may be performance costs for using this connector. The initialization XML for the DataSourceConnector is quite different from the others:

| Element | Parent | Attribute | Required? | Definition |
|---|---|---|---|---|
| ConnectionAttributes | | | Yes | Specifies the external data source. |
| ConnectionAttributes | | SOURCENAME | Yes | The name of the data source to connect to. This must be the name of a known data source. |
| RootName | | | Yes | The name of the root to use for search and retrieval operations. If the CatalogProperties element is not present, the metadata for the data source is obtained from the catalog by using this root name with the HIERARCHY property. |
| CatalogProperties | | | No | Contains the list of property/value pairs using IDBCatalog.getCatalogMetaData( ) to retrieve the metadata to use for the hierarchy. If not present, the value of the RootName element is used to obtain metadata. |
| Property | CatalogProperties | NAME | Yes | A property name to use when querying the catalog for metadata |
| Property | CatalogProperties | VALUE | Yes | A property value to use when querying the catalog for metadata |

```
<Connector NAME="Beilstein" TYPE="DataSourceConnector"
        FROMTABLE="ACD2D_MOLTABLE">
<ConnectionAttributes SOURCENAME="XFireprod"/>
<RootName>bs0302ae.s</RootName>
<LinkFields>
    <LinkField FROMFIELD="COMPOUND_ID" TOFIELD="BRN"/>
```

-continued

```
</LinkFields>
</Connector>
```

Notes on the DataSourceConnector
1) Only a fixed hierarchy can be integrated via the data source connector. The values of either the RootName or the CatalogProperties element are used to specify which hierarchy to use.
2) The value of the LinkField element(s) specifies how the fields in the parent data source and external data source are related.

GLOSSARY

This glossary contains terms used in this description.

| Term | Definition |
|---|---|
| ancillary cartridge connector | A type of connector that provides the ability to use special functions associated with the molecule and reaction cartridge search functions. These special functions are used in the SELECT clause, and return data which is associated with a specific search function in the query. |
| base connector | A connector that is extended by another connector. The attributes and child elements of the base connector will be inherited by the sub-connector. |
| calculator connector | A type of connector that allows custom calculators to be used within a data network. |
| connector | XML description of a relationship between two nodes of data. A connector contains definitions and properties that are used to generate the native query for searching and retrieval of data. |
| data model | A description of the logical or physical relationships between entities in a database. |
| data network | A series of nodes and connectors that describe a complex data model. |
| data source | A repository of data with a recognizable and consistent set of data types that are accessed and exposed by MDL Core Interface. |
| data source connector | A type of connector that allows hierarchies from non-relational tables to be integrated into a derived hierarchy. |

-continued

| Term | Definition |
| --- | --- |
| derived hierarchy | A hierarchy of fields of data that is formed by the linked connectors. |
| deferred retrieval | A type of retrieval in which the retrieval of linked data is postponed until the application explicitly requests for this data. |
| filter | A query condition that narrows the search results into records that match the specified filter values. A filter is derived from the executed query but is used at retrieval time to ensure that the retrieved data matches the query asked. A filter is used when retrieving data from a parent field. |
| Hview | An editable text file that provides a unified view of heterogeneous data sources supported by MDL, such as an ISIS/Host database. |
| Hview data source | A type of data source that represents an ISIS/Host database. |
| integrating data source | A type of data source that provides the ability to define and search multiple hierarchical views of the same data model. The integrating data source also provides extended functionality such as pivoting of data, custom calculators, and the ability to integrate non-relational data into a derived hierarchy. |
| link field | A field that a connector uses to link one node to another. The join of two link fields is included in the WHERE clause of the generated native query. |
| linked node | The node that the connector connects the source node to. This is the data specified in the TOTABLE attribute of the Connector element. This is also sometimes referred to as "linked data". |
| lower-level field | A field in a recordset under a parent field. |
| metadata | Information about the contents of a recordset or data source. |
| metatag | A custom XML attribute or tag that can be added to an output field definition (in a connector definition). This custom name/value tag will be copied to the output field definition in the metadata. |
| native query | A query that uses the native language of the underlying data source. For example, the native query of a relational data source is SQL. |
| node | A set of data that a connector links to another set of data. A node can either be a relational table, a data hierarchy, a SQL statement, a calculation, or a data source. |
| one-to-many connector | A type of connector that links two relational tables with a one-to-many relationship. The linked data creates a recordset under a parent field in the hierarchy of the source data. The retrieval of the linked data is deferred until requested. |
| one-to-many select connector | A type of connector that is similar to a one-to-many connector, except that the one-to-many select connector links a relational table to the results of a SELECT statement, instead of another table. |
| one-to-one connector | A type of connector that links two relational tables with a one-to-one relationship. The linked data is flattened into the same level of the hierarchy as the source data. The retrieval of the linked data is performed at the same time the data is retrieved for the source data. |
| one-to-one deferred connector | A type of connector that links two relational tables with a one-to-one relationship. The linked data is flattened into the same level of the hierarchy as the source data. The retrieval of the linked data is deferred until requested. |
| one-to-one parent connector | A type of connector that links two relational tables with a one-to-one relationship. The linked data creates a recordset under a parent field in the hierarchy of the source data, even though the relationship is one-to-one. The recordset in the parent field will contain at most a single record. The retrieval of the linked data is performed at the same time the data is retrieved for the source data. |
| one-to-one select connector | A type of connector that is similar to a one-to-one connector, except that the one-to-one select connector links a relational table to the results of a SELECT statement, instead of another table. |
| output field | A field to be included in a derived hierarchy. This field is included in the SELECT clause of the generated native query. |
| parent field | A field at the top of a level in a data hierarchy. A parent field does not have data in itself, but contains a recordset containing the lower-level data. |
| pivot connector | A type of connector that extends the functionality of a one-to-many connector by allowing transparent pivoting of data. |
| pivoting | A technique that transforms data based on index and pivot fields. For example, transforming a tall, skinny table (with many rows, few columns) into a short, fat table (with few rows, many columns). |
| primitive data source | A single, non-integrating data source. |

-continued

| Term | Definition |
|---|---|
| query | A command that searches and retrieves data. Use UQL to write queries on data networks of an integrating data source. |
| recordset | A collection of records of data. Core Interface returns the results of a search in a recordset. |
| relational data source | A type of data source that represents an Oracle database, including databases that use the MDL Direct molecule and reaction cartridges. |
| root connector | A connector that provides an entry point to a data network. |
| root field | A field at the very top level of a data hierarchy. |
| source node | The node that the connector connects the linked node from. This is the data specified in the FROMTABLE attribute of the Connector element. This is also sometimes referred to as "source data". |
| sub-connector | A connector that extends a base connector. The sub-connector inherits the attributes and child elements of the base connector. Except for the TYPE attribute, the sub-connector can override the attributes and child elements of the base connector. |
| SQL | The native language for querying a relational database. |
| UQL | A SQL-like language that provides a standard syntax and set of expressions for constructing queries. UQL stands for "Unified Query Language", which is a feature of the Data Source Service of MDL Core Interface. |
| unified query | A query written using UQL. |
| XML | A standard for defining markup languages for managing and transmitting structured information. XML stands for "Extensible Markup Language." |
| XML data source | A type of data source that represents XML data using the XDfile (formerly "MDLXML") format. |

IDS Specific Interfaces
Interface IIDSCalculator
Public interface IIDSCalculator
Custom calculators need to implement this interface.

| Method Summary | |
|---|---|
| java.lang.Object | calculate(com.mdli.isentris.datasource.-interfaces.IDB RecordSet rs, com.mdli.isentris.datasource.interfaces.-IDBField field) Return the result for a calculation |
| com.mdli.isentris.util.client.IICSError | getLastError( ) Return the cause of failure |
| boolean | initialize(IDBDataSource ds, com.mdli.isentris.util.XMLNode xml) Initialize this calculator | initialize
public boolean initialize(IDBDataSource ds, com.mdli.isentris.util.XMLNode xml)
Initialize this calculator
Parameters:
ds—The partially initialized IDS.
xml—The parsed XML tree for this connector
Returns:
true if successful. Return false if there was an error and provide additional error information in getLastError( )
calculate
public java.lang.Object
calculate(com.mdli.isentris.datasource-.interfaces.IDBRecordSet rs, com.mdli.isentris.datasource-.interfaces.IDBField field)
Return the result for a calculation
Parameters:
rs—The source recordset
field—The field for the calculation
Returns:
The calculation value.

getLastError
public com.mdli.isentris.util.client.IICSError getLastError( )
Return the cause of failure
Returns:
an object which implements IICSError
Interface IIDSInitializer
public interface IIDSInitializer
This interface is used for custom initialization.

| Method Summary | |
|---|---|
| com.mdli.isentris.util.client.IICSError | getLastError( ) Return the cause of failure |
| java.lang.String | initialize(IDBDataSource ds, com.mdli.isentris.util.XMLNode xml) Return initialization XML for this data source | initialize
public java.lang.String initialize(IDBDataSource ds, com.mdli.isentris.util.XMLNode xml)
Return initialization XML for this data source
Parameters:
ds—The partially initialized IDS. All connectors defined within the datasource.xml file will have been created and validated.
xml—The parsed XML tree of element
Returns:
Initialization XML of the form:
<Top><Roots><Root/> . . .
</Roots><Connectors><Connector/> . . . </Connectors></Top>
where the element tag for "top" is ignored. Return null if there was an error and provide additional error information in getLastError( )
getLastError public com.mdli.isentris.util.client.IICSError getLastError( )
  Return the cause of failure
  Returns:
  an object which implements IICSError
Usage Scenarios
This section provides scenarios illustrating benefits of using the IDS in various embodiments.

1. A scientist can assemble any IDS query using an integrating data source. They can create a list of return data fields using the same integrating data source definition. The resulting data permits data retrieval in a variety of display formats that are independent of the data sources. The integrated data source handles query and data retrieval optimization, hides the internal complexities, and provides the underlying functionality for a user-friendly working environment. Once the IDS query is constructed, the IDS may provide feedback on query validity. The query may then be constructed for optimum performance for both query execution and data retrieval. The user may be presented with indicators that their query is properly being executed. The scientist may interrupt the query/results execution both during the query phase, and during the results retrieval phase. Ideally, search interruption is handled by Oracle. At the application level, the scientist is able to pause and continue or terminate the results retrieval phase.

The result of this capability is that a chemist interested mostly in the chemistry aspects of drug research may design his queries in a more "chemistry centric" orientation, while a biologist could design his queries in a more "biology centric" orientation. The centricity of each query/results execution would depend on two factors: the query expression, and the configuration of the IDS. The same IDS could support both chemistry and biology-centric queries. A scientist may set a preference for returning chemistry or biology-centric results, regardless of the type of query executed, and perform list operations on the resulting record sets.

2. An administrator has previously prepared, tested, and deployed an IDS for query/results retrieval of biological, chemical, and inventory information. He has created a single IDS XML configuration file for accessibility by the biologists, chemists, and inventory personnel. However, they now need to integrate these data sources into a new solution, without disrupting the current query/retrieval operations being performed independently by each group.

The administrator may add new entity hierarchies to the existing ones without being forced to copy connector XML code between the existing biological, chemical, and inventory tags. He may create biological-chemical, chemical-biological, and any other combination of entity hierarchies in any order without having to replicate existing XML code. Typical entity types include chemical, biological and inventory, but could include many others, as will be recognized by those skilled in the art.

The administrator may perform this operation by simply connecting existing entity hierarchies into their various combinations in order to provide a more diverse integrated query/result retrieval system. Then the chemists can search across the other scientific areas using the new entity hierarchies. If a chemist only executes search/results retrieval against the chemical data, the old chemical entity hierarchy will automatically be employed as it was before, and he will obtain the same root level results.

3. A user or developer opens an integrating data source and executes a search against a root hierarchy. The user then returns the resulting hits into a large document and views the data in a small window on that large document. While scrolling the original data, the user gets a bright idea about some related data, and then wishes to execute another query against a second data source, without losing the contents of the original search. They may perform a secondary root search and data display without affecting the contents of the original search. The effect is that different IDS roots may be searched independently without corrupting or resetting each other. The only time that the original contents of the search would be replaced or invalidated is when the original root is again used to execute a search.

This capability of simultaneously executing and viewing multiple searches against different IDS roots has significant advantages in application design and usability.

4. An End-User is trying to do a search for a series of reagents. The user is using a series of databases (ACD, Aldrich, and a internal stock room database). The search was a simple SSS for the base structure. The user puts a structure into a box on the form. The query is executed and the results are displayed as the first record and the total number of hits from all data sources and the number of hits in each of the databases. The user then scrolls through each record selecting which records should be ordered from the vendor.

5. An end-user searches for a structure based on a structure and criteria from a set of regulation tables. The regulation tables are lists of IDs and the type of the substance and the user's authority to order/work with the selected structure. A list of structures is returned from the query and displayed on the screen. The user selects one compound and displays the structure and all the relevant compound data. The user selects a tab that displays the Structure, ID and all the regulatory data for this structure.

6. An administrator receives a file with all the new regulated substances listed by CAS number and name. The administrator must now search on all the CAS numbers and generate a list of structures corresponding to those numbers. Then all the instances of those structures must have their primary keys registered to a cross-reference table for regulated data.

7. A biologist has just gotten an idea for a type of compound for a new receptor site. The biologist wants to search and display any historical compounds in the sample room for testing that have good ADME numbers. The biologist wants to see what tests have previously have been done on these compounds. The biology data is stored in a group of long, skinny tables. The biologist enters the substructure and ADME threshold that will provide an acceptable level to get the compound into the system. The biologist knows the test but not the databases and needs to be helped with the query, as the data is not in a searchable form natively. The search is performed and the structures and all tests previously run on the compounds will now be displayed on the screen.

8. Change hierarchies during a series of narrowing searches

Rationale: One of the criticisms with HVIEWs was the fact that each "database" had a pre-defined hierarchy. If you needed to change the root, you had to open another database, even if it was accessing the same data.

Description: Search over reactions and on the result set; narrow the search with product molecule-related criteria.

Steps: i) Open an IDS with reaction, molecule role (1:n), molecule (1:1) and molecule properties (1:n).
  ii) Perform a reaction search (RSS).
  iii) Browse the reaction based record and view data related to various molecules.
  iv) Transform List to Product Molecules.
  v) Perform a search on the product molecules (say non-structural, maybe property related).

vi) Browse the product molecule based record set and view data related to reactions as well as molecule properties.

9. A user executes a lower level search against an IDS and gets a hierarchical recordset. The user then wishes to execute a second search against this same hierarchy by setting the search domain in the lower level where he had executed the previous search. The user may set the lower level domain to further refine the content of his subsequent searches.

He also may perform searches at any level in the IDS hierarchy and then set the current search/view domain for this or any other level in the hierarchy. The alternative to this is that the user would be forced to execute much more complex queries in order to further limit his search hits, and this would likely lead to significant performance problems.

10. A biologist views five Assays (as the root) containing results with molecule information. The recordset represents 100 molecules in all. The biologist would like to turn the results on their head and view by the Molecule as the root. He may re-execute a query and set the root to be Molecule and use the Molecule IDs from the recordset to view the previous recordset by molecule, i.e. the user gets to see 100 records and sees all the Assay Results pertaining to each structure.

11. Connectors support the use of Oracle Text and Oracle XMLDB functionality. For example, select statements such as these are supported:

```
SELECT SCORE(1), id, name, result FROM test_data
WHERE CONTAINS(abstract, 'NEAR((receptor, kinase), 10)', 1) > 0
ORDER BY SCORE;
``` or

```
SELECT EXTRACTVALUE(VALUE(report_table),
    '/report/conclusion')
    FROM XMLTABLE report_table
```

This enables integration of searches into documents, reports, etc.

While the embodiments shown and described herein are fully capable of achieving the objects of the invention, it is to be understood that these embodiments are shown only for the purpose of illustration and not for the purpose of limitation, and that variations will be apparent to those skilled in the art in light of the foregoing description.

APPENDIX A

A Complete Example

Figure 3:
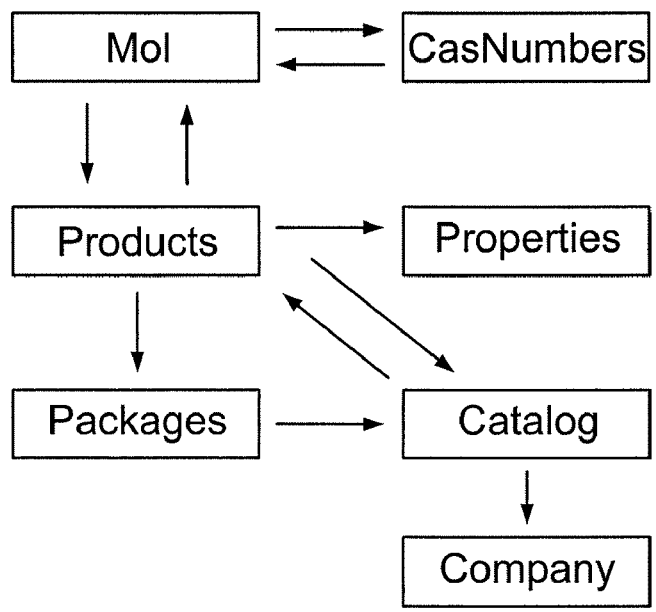
FIG. 3 is a graphical view of the network described in Appendix A.

The following is a complete definition of connectors to access a preferred data model. It allows molecules, casNumbers, products, packages, or catalogs to be the root of the derived hierarchy. FIG. 3 is a graphical view of the network.

```
<DataSource NAME="NewACDOracle" TYPE="IDS">
  <Connection>
    <ConnectionAttributes SOURCENAME="OracleNewACD"/>
    <Roots>
      <Root ID="Mol1">
        <Hierarchy NAME="MolRoot"
SELECT_LIST="*,casnumbers.*,products.*,products.packages.*,
products.packages.catalog.*,products.packages.catalog.company.*"/>
      </Root>
      <Root ID="Catalog1">
        <Hierarchy NAME="CatalogRoot"
SELECT_LIST="*,company.*,products.*,products.mol.*"/>
      </Root>
      <Root ID="Products1">
        <Hierarchy NAME="ProductRoot"
SELECT_LIST="*,mol.*,packages.*,catalog.*"/>
      </Root>
      <Root NAME="Packages"/>
      <Root NAME="CASNumbers"/>
    </Roots>
    <Connectors>
      <Connector NAME="Mol" ID="Mol1"
CONNECTOR="OneToManyDataConnector"
        FROMTABLE="ACD2D_PRODUCT"
        TOTABLE="ACD2D_MOLTABLE">
        <LinkFields>
          <LinkField FROMFIELD="CDBRegno"
TOFIELD="CDBRegno"/>
        </LinkFields>
        <OutputFields>
          <OutputField NAME="CDBRegno"/>
          <OutputField NAME="MolName"/>
          <OutputField NAME="MDLNumber"/>
          <OutputField NAME="Molweight"/>
          <OutputField NAME="CLOGP"/>
          <OutputField NAME="CTAB" PATH="DeferredCTAB"/>
        </OutputFields>
      </Connector>
      <Connector NAME="Mol" EXTENDS="Mol1"
FROMTABLE="ACD2D_CAS"
        TOTABLE="ACD2D_MOLTABLE"/>
      <Connector NAME="DeferredCTAB"
CONNECTOR="OneToOneDeferredConnector"
        FROMTABLE="ACD2D_MOLTABLE"
TOTABLE="ACD2D_MOLTABLE" TOTABLEALIAS="M">
        <LinkFields>
          <LinkField FROMFIELD="CDBREGNO"
TOFIELD="CDBREGNO"/>
        </LinkFields>
        <OutputFields>
          <OutputField NAME="CTAB"/>
        </OutputFields>
        <Properties>
          <Property NAME="USEDISTINCT" VALUE="false"/>
        </Properties>
      </Connector>
      <Connector NAME="CASNumbers"
CONNECTOR="OneToManyDataConnector"
        FROMTABLE="MOLTABLE" TOTABLE="ACD2D_CAS">
        <LinkFields>
          <LinkField FROMFIELD="CDBRegno"
TOFIELD="CDBRegno"/>
        </LinkFields>
        <OutputFields>
          <OutputField NAME="CDBRegno"/>
          <OutputField NAME="CAS_TEXT"
ALIAS="CASNumber"/>
        </OutputFields>
        <Properties>
          <Property NAME="SEARCH_JOIN_TYPE"
VALUE="LeftOuter"/>
        </Properties>
      </Connector>
      <Connector NAME="Products" ID="Products1"
CONNECTOR="OneToManyDataConnector"
FROMTABLE="ACD2D_MOLTABLE"
TOTABLE="ACD2D_PRODUCT">
        <LinkFields>
          <LinkField FROMFIELD="CDBRegno"
TOFIELD="CDBRegno"/>
        </LinkFields>
        <OutputFields>
          <OutputField NAME="CDBRegno" HIDDEN="true"/>
          <OutputField NAME="PID" HIDDEN="true"/>
          <OutputField NAME="CTID" HIDDEN="true"/>
          <OutputField NAME="Purity"/>
          <OutputField NAME="FB"/>
          <OutputField NAME="CRREL"/>
        </OutputFields>
```

-continued

```
        </Connector>
        <Connector NAME="Products" EXTENDS="Products1"
FROMTABLE="ACD2D_CATALOG"
TOTABLE="ACD2D_PRODUCT">
            <LinkFields>
                <LinkField FROMFIELD="CTID" TOFIELD="CTID"/>
            </LinkFields>
        </Connector>
        <Connector NAME="Packages"
CONNECTOR="OneToManyDataConnector"
FROMTABLE="ACD2D_PRODUCT"
TOTABLE="ACD2D_PACKAGE">
            <LinkFields>
                <LinkField FROMFIELD="PID" TOFIELD="PID"/>
            </LinkFields>
            <OutputFields>
                <OutputField NAME="PACKID" HIDDEN="true"/>
                <OutputField NAME="CTID" HIDDEN="true"/>
                <OutputField NAME="CTNUM" HIDDEN="true"/>
                <OutputField NAME="CDBRegno" HIDDEN="true"/>
                <OutputField NAME="QUANT"/>
                <OutputField NAME="UNITS"/>
                <OutputField NAME="CURRENCY"/>
                <OutputField NAME="NORMPRICE"/>
            </OutputFields>
        </Connector>
        <Connector NAME="RegionIDTOName"
CONNECTOR="OneToOneDataConnector"
FROMTABLE="ACD2D_COMPANY"
TOTABLE="ACD2D_REGION">
            <LinkFields>
                <LinkField FROMFIELD="REGID"
                    TOFIELD="REGID"/>
            </LinkFields>
            <OutputFields>
                <OutputField NAME="REGID" HIDDEN="true"/>
                <OutputField NAME="REGNAME"/>
            </OutputFields>
        </Connector>
        <Connector NAME="Company"
CONNECTOR="OneToOneParentConnector"
FROMTABLE="ACD2D_CATALOG"
TOTABLE="ACD2D_COMPANY">
            <LinkFields>
                <LinkField FROMFIELD="CPYID"
                    TOFIELD="CPYID"/>
            </LinkFields>
            <OutputFields SELECT_ALL="true">
                <OutputField NAME="CPYID" HIDDEN="true"/>
                <OutputField NAME="TYPE" REMOVE="true"/>
            </OutputFields>
        </Connector>
        <Connector NAME="Catalog" ID="Catalog1"
CONNECTOR="OneToOneParentConnector"
FROMTABLE="ACD2D_PRODUCT"
TOTABLE="ACD2D_CATALOG">
            <LinkFields>
                <LinkField FROMFIELD="CTID" TOFIELD="CTID"/>
            </LinkFields>
            <OutputFields SELECT_ALL="true">
                <OutputField NAME="CTID" HIDDEN="true"/>
                <OutputField NAME="CPYID" HIDDEN="true"/>
            </OutputFields>
        </Connector>
        <Connector NAME="Catalog" EXTENDS="Catalog1"
FROMTABLE="ACD2D_PACKAGE"
TOTABLE="ACD2D_CATALOG"/>
        <Connector NAME="PropIDToName"
CONNECTOR="OneToOneDataConnector"
FROMTABLE="ACD2D_PRODUCT_DATA"
TOTABLE="ACD2D_PROPDICT">
            <LinkFields>
                <LinkField FROMFIELD="PROP_ID"
TOFIELD="PROP_ID"/>
            </LinkFields>
            <OutputFields>
                <OutputField NAME="NAME"/>
            </OutputFields>
        </Connector>
        <Connector NAME="PivotedProperties"
CONNECTOR="PivotConnector"
FROMTABLE="ACD2D_PRODUCT"
TOTABLE="ACD2D_PRODUCT_DATA">
            <OutputFields>
                <OutputField NAME="PID"/>
                <OutputField NAME="PROP_ID"/>
                <OutputField NAME="VALUE_CHAR"/>
            </OutputFields>
            <LinkFields>
                <LinkField FROMFIELD="PID" TOFIELD="PID"/>
            </LinkFields>
            <Properties>
                <Property NAME="USEDISTINCT" VALUE="true"/>
                <Property NAME="FILTER" VALUE="false"/>
            </Properties>
            <PivotParams>
                <IndexFields>
                    <Field>PID</Field>
                </IndexFields>
                <FieldsToPivot>
                    <Field>NAME</Field>
                </FieldsToPivot>
                <ValuesToPivot>
                    <Field>VALUE_CHAR</Field>
                </ValuesToPivot>
                <PivotedFields>
                    <MetaData>
                        <FieldDef NAME="Name" TYPE="VariableText"/>
                        <FieldDef NAME="Cas" TYPE="VariableText"/>
                        <FieldDef NAME="Comment"
TYPE="VariableText"/>
                        <FieldDef NAME="Information"
TYPE="VariableText"/>
                        <FieldDef NAME="Specification"
TYPE="VariableText"/>
                        <FieldDef NAME="Property"
TYPE="VariableText"/>
                        <FieldDef NAME="Purity" TYPE="VariableText"/>
                    </MetaData>
                </PivotedFields>
            </PivotParams>
        </Connector>
    </Connectors>
    </Connection>
    <Properties>
        <Property NAME="USEDISTINCT" VALUE="false"/>
        <Property NAME="PRINT_QUERY_CONNECTORS"
VALUE="true"/>
        <Property NAME="PRINT_TRANSLATED_QUERY"
VALUE="true"/>
        <Property NAME="PRINT_RETRIEVE_SQL" VALUE="true"/>
    </Properties>
</DataSource>
```

APPENDIX B

Exemplary IDS Patterns

Pattern: One-to-one between table columns with implicit linkage and immediate retrieval Example CDBRegno to Corporate ID Lookup Table Structure:

| |
|---|
| Mol |
|   CDBRegno |
| CDBRegnoToCorpID |
|   CDBRegno |
|   CorpID |

Connectors:

```
<Connector NAME="Mol" TYPE="OneToManyDataConnector"
TOTABLE="Mol">
    <OutputFields>
        <OutputField NAME="CDBRegno"/>
    </OutputFields>
</Connector>
<Connector NAME="Lookup" TYPE="OneToOneDataConnector"
FROMTABLE="Mol" TOTABLE="CDBRegnoToCorpID">
    <LinkFields>
        <LinkField FROMFIELD="CDBRegno"
TOFIELD="CDBRegno"/>
    </LinkFields>
    <OutputFields>
        <OutputField NAME="CorpID"/>
    </OutputFields>
</Connector>
```

Usage:
Query: select cdbregno,corpid from mol
Resulting Metadata:
Mol
   CDBRegno
   CorpID
Query: select * from mol
Resulting Metadata:
Mol
   CDBRegno
Notes:
1. The CorpID field will not be retrieved if a select all, e.g., select * from Mol, expression is used since it is not specified as an output field of the Mol connector. In order for CorpID to be retrieved in this case, it must be referenced explicitly as in select *, CorpID from Mol. This lets the query analyzer know to look for a connector that can provide the CorpID field.
2. This pattern probably will not be used very often since it requires a field to be referenced directly and then incurs the cost of immediate retrieval. This type of relationship will be more likely to use explicit linkage with or without deferred retrieval.
3. Note that if CorpID is specified in the select list, any retrieval of data from the Mol connector will include the joins and retrieval of values of CorpID table. (This is immediate retrieval.) To defer the retrieval, see the related pattern which specifies how do to deferred retrieval.
4. This pattern is useful if a field is rarely retrieved. The CTAB field is an example of this. It cannot be retrieved to the client since it cannot be converted into anything useful. It is, however, sometimes retrieved by subqueries. For example, select * from mol where sss(ctab, select ctab from Mol where cdbregno=1)=1. This pattern makes the field available for retrieval but only when explicitly referenced.
Pattern: One-to-one between table columns with explicit linkage and immediate retrieval Example CDBRegno to Corporate ID Lookup Table Structure:

Mol
   CDBRegno
CDBRegnoToCorpID
   CDBRegno
   CorpID

Connectors:

```
<Connector NAME="Mol" TYPE="OneToManyDataConnector"
TOTABLE="Mol">
    <OutputFields>
        <OutputField NAME="CDBRegno"/>
        <OutputField NAME="CorpID" PATH="Lookup"/>
    </OutputFields>
</Connector>
<Connector NAME="Lookup" TYPE="OneToOneDataConnector"
FROMTABLE="Mol" TOTABLE="CDBRegnoToCorpID">
    <LinkFields>
        <LinkField FROMFIELD="CDBRegno"
TOFIELD="CDBRegno"/>
    </LinkFields>
    <OutputFields>
        <OutputField NAME="CorpID"/>
    </OutputFields>
</Connector>
```

Usage:
Query: select * from mol
Resulting Metadata:
Mol
   CDBRegno
   CorpID
Notes:
1. An explicit linkage between connectors, specified with the PATH attribute, allows the linkage to be completely hidden from the user. In this case, a select all query, e.g., select * from Mol, will retrieve CorpID since it has been specified as an output field from the Mol connector.
3. Note that any retrieval of data from the Mol connector will include the joins and retrieval of values of CorpID table. (This is immediate retrieval.) To defer the retrieval see the related pattern which specifies how do to deferred retrieval.
Pattern: One-to-one between table columns with explicit linkage and deferred retrieval Example CDBRegno to Corporate ID Lookup Table Structure:

Mol
   CDBRegno
CDBRegnoToCorpID
   CDBRegno
   CorpID
   CorpID2

Connectors:

```
<Connector NAME="Mol" TYPE="OneToManyDataConnector"
TOTABLE="Mol">
    <OutputFields>
        <OutputField NAME="CDBRegno"/>
        <OutputField NAME="CorpID" PATH="Lookup"/>
        <OutputField NAME="CorpID2" PATH="Lookup"/>
    </OutputFields>
</Connector>
<Connector NAME="Lookup"
TYPE="OneToOneDeferredConnector" FROMTABLE="Mol"
TOTABLE="CDBRegnoToCorpID">
    <LinkFields>
        <LinkField FROMFIELD="CDBRegno"
```

```
-continued
TOFIELD="CDBRegno"/>
        </LinkFields>
        <OutputFields>
            <OutputField NAME="CorpID"/>
            <OutputField NAME="CorpID2"/>
        </OutputFields>
    </Connector>
```

Usage:
Query: select * from mol
Resulting Metadata:
Mol
   CDBRegno
   CorpID
   CorpID2
Notes:
1. This pattern is identical to the previous one except that the OneToOneDataConnector is replaced with a OneToOneDeferredConnector. This change will cause the retrieval of the CorpID value to be deferred until it is actually requested. The retrieval requires an additional SQL statement to be executed.

2. This pattern is typically used for data which is either expensive to retrieve or whose data type is incompatible with SQL queries. (For example, BLOBS cannot be retrieved in a SQL statement which includes the distinct operator.)

3. This also illustrates that more than one field can be handled by a One-to-one connector.

Pattern: One-to-one between table column and function with explicit linkage and deferred retrieval Example CDBRegno to Structure Chime String Table Structure:

Mol
   CDBRegno
   CTAB

Connectors:

```
<Connector NAME="Mol" TYPE="OneToManyDataConnector" TOTABLE="Mol">
    <OutputFields>
        <OutputField NAME="CDBRegno"/>
        <OutputField NAME="MCHIME" PATH="DeferredChime"/>
    </OutputFields>
</Connector>
<Connector NAME="DeferredChime" TYPE="OneToOneDeferredConnector" FROMTABLE="Mol" TOTABLE="Mol">
    <LinkFields>
        <LinkField FROMFIELD="CDBRegno" TOFIELD="CDBRegno"/>
    </LinkFields>
    <OutputFields>
        <OutputField NAME="CHIME_string(CTAB)" ALIAS="MCHIME" ISFUNCTION="true" TYPE="Structure" MOLFORMAT="CHIME" SEARCHABLE="false"/>
    </OutputFields>
</Connector>
```

Usage:
Query: select * from mol
Resulting Metadata:
Mol
   CDBRegno
   MCHIME
Notes:
1. This pattern is identical to the previous one except that the linked data is the result of a function call 2. This pattern is used for the same reason as the previous: to defer expensive or incompatible retrievals. It also hides the complexities of function calls from the user.

3. Note that the connectors link to the same table.

Pattern: One-to-one between table columns through multiple lookup tables

Example

CDBRegno to CorpID

Table Structure:

Mol
   CDBRegno
   CTAB
Lookup1
   CDBRegno
   ExtRegno
Lookup2
   ExtRegno
   CorpID Connectors:

```
<Connector NAME="Mol" TYPE="OneToManyDataConnector" TOTABLE="Mol">
    <OutputFields>
        <OutputField NAME="CDBRegno"/>
        <OutputField NAME="CorpID" PATH="Lookup1.Lookup2"/>
    </OutputFields>
</Connector>
<Connector NAME="Lookup1" TYPE="OneToOneDeferredConnector" FROMTABLE="Mol" TOTABLE="Lookup1">
    <LinkFields>
        <LinkField FROMFIELD="CDBRegno" TOFIELD="ExtRegno"/>
    </LinkFields>
    <OutputFields>
        <OutputField NAME="ExtRegno"/>
    </OutputFields>
</Connector>
<Connector NAME="Lookup2" TYPE="OneToOneDataConnector" FROMTABLE="Lookup1" TOTABLE="Lookup2">
    <LinkFields>
        <LinkField FROMFIELD="ExtRegno" TOFIELD="ExtRegno"/>
    </LinkFields>
    <OutputFields>
        <OutputField NAME="CorpID"/>
    </OutputFields>
</Connector>
```

Usage:
Query: select * from mol

Resulting Metadata:
Mol
   CDBRegno
   CorpID

Notes:

1. This pattern is similar to the previous ones except that it shows how the explicit PATH attribute can specify a multi-connector path.

2. If there is another connector that uses the value of CorpID for linking to the Mol connector, it can specify CorpID as the FROMFIELD and the lookups will be handled transparently. This is shown in a One-to-many pattern below.

Pattern: One-to-one between table columns with parent created

Example

Company Name to Address with Address Grouped Under a Parent

Table Structure:

```
              Company
                  CompanyID
                  Name
              Address
                  CompanyID
                  Street
                  City
                  State
                  Country
```

Connectors:

```
<Connector NAME="Company" TYPE="OneToManyDataConnector" TOTABLE="Company">
    <OutputFields>
        <OutputField NAME="CompanyID" HIDDEN="true"/>
        <OutputField NAME="Name"/>
    </OutputFields>
</Connector>
<Connector NAME="Address" TYPE="OneToOneParentConnector" FROMTABLE="Company" TOTABLE="Address">
    <LinkFields>
        <LinkField FROMFIELD="CompanyID" TOFIELD="CompanyID"/>
    </LinkFields>
    <OutputFields>
        <OutputField NAME="Street"/>
        <OutputField NAME="City"/>
        <OutputField NAME="State"/>
        <OutputField NAME="Country"/>
    </OutputFields>
</Connector>
```

Usage:
Query: select * from company
Resulting Metadata:
Company
  Name
  Address
    Street
    City
    State
    Country Notes:

1. A pattern-child relationship is sometimes useful for logically grouping data even if the data relationship is One-to-one.

2. This same pattern can be used and the same result obtained even if the address data is in the same table as the rest of the company data. In this case, the TOTABLE attribute of the Address connector would just be the same Company table.

Pattern: One-to-one returning complex data

Example

Retrieval of BLOB Data which Requires an External Java Class for Manipulation

Table Structure:

```
              Root
                  ID
                  ComplexData
```

Connectors:

```
<Connector NAME="Root" TYPE="OneToManyDataConnector" TOTABLE="Root">
    <OutputFields>
        <OutputField NAME="ID"/>
        <OutputField NAME="ComplexData" TYPE="Binary" FIELDWRAPPER="com.mycompany.ComplexWrapper"/>
    </OutputFields>
</Connector>
```

Usage:
Query: select * from root
Resulting Metadata:
Root
  ID
  ComplexData (returned as an instance of ComplexWrapper)

Notes:

1. When structured data is stored as BLOBS in an RDBMS, a wrapper class may be required to manipulate that data. This pattern provides a way of handling that situation. The when the FIELDWRAPPER attribute is specified, the IDS automatically returns the data as an instance of the specified class. See information on the FieldWrapper class for more information.

Pattern: One-to-one calculations

Example

Retrieval of External Calculations

Table Structure:

```
              Root
                  StringValue
                  NumericValue
```

Connectors:

```
<Connector NAME="Root" TYPE="OneToManyDataConnector" TOTABLE="Root">
    <OutputFields>
        <OutputField NAME="StringValue"/>
```

```
        <OutputField NAME="NumericValue"/>
    </OutputFields>
</Connector>
<Connector NAME="Calc" TYPE="CalculatorConnector" FROMTABLE="Root">
    <LinkFields>
        <LinkField FROMFIELD="StringValue"/>
        <LinkField FROMFIELD="NumericValue"/>
    </LinkFields>
    <OutputFields>
        <OutputField NAME="Calc_double" TYPE="Double"/>
        <OutputField NAME="Calc_string" TYPE="VariableText"/>
    </OutputFields>
    <Properties>
        <Property NAME="CALCULATORCLASS" VALUE="com.mycompany.CalculatorTest"/>
    </Properties>
</Connector>
```

Usage:
Query: select * from root
Resulting Metadata:
Root
StringValue
NumericValue
Query: select *,calc_double,calc_string from root
Resulting Metadata:
Root
StringValue
NumericValue
Calc_double
Calc_string
Notes:
1. This pattern allows external calculations to be included within a connectors output. The calculation is carried out by the specified calculator class, which must implement the IIDSCalculator interface, specified in the CALCULATORCLASS property.
2. The fields that provide the input data for the calculation should be specified as link fields in the CalculatorConnector.
3. Calculated fields are automatically marked as not searchable.
4. The calculators are defined without an explicit linkage but one could have been specified via the PATH attribute.
Pattern: One-to-many between tables Example Several Names for a Given Structure Table Structure:

|  |
| --- |
| Mol |
|     CDBRegno |
| MolNames |
|     CDBRegno |
|     MolName |

Connectors:

```
<Connector NAME="Mol" TYPE="OneToManyDataConnector" TOTABLE="Mol">
    <OutputFields>
        <OutputField NAME="CDBRegno"/>
```

```
    </OutputFields>
</Connector>
<Connector NAME="MolNames" TYPE="OneToOneManyDataConnector" FROMTABLE="Mol" TOTABLE="MolNames">
    <LinkFields>
        <LinkField FROMFIELD="CDBRegno" TOFIELD="CDBRegno"/>
    </LinkFields>
    <OutputFields>
        <OutputField NAME="MolName"/>
    </OutputFields>
</Connector>
```

Usage:
Query: select *,MolNames. from Mol
Resulting Metadata:
Mol
CDBRegno
MolNames
    MolName
Notes:
1. This is the standard pattern used for almost all One-to-many relationships. Retrieval is always deferred.
Pattern: One-to-many between tables with filter values Example Separation of Reaction Components into Role Specific Subparents Table Structure:

|  |
| --- |
| Rxn |
|     RIRegno |
| RxnMol |
|     RIRegno |
|     Role |
|     MolRegno |
| Mol |
|     MolRegno |
|     CTAB |
|     MolWt |

Connectors:

```
<Connector NAME="Rxn" TYPE="OneToManyDataConnector" TOTABLE="Rxn">
    <OutputFields>
        <OutputField NAME="RIRegno"/>
    </OutputFields>
</Connector>
<Connector ID="ComponentBase" TYPE="OneToOneManyDataConnector" FROMTABLE="Rxn" TOTABLE="RxnMol">
    <LinkFields>
        <LinkField FROMFIELD="RIRegno" TOFIELD="RIRegno"/>
    </LinkFields>
</Connector>
<Connector NAME="Reactants" EXTENDS="ComponentBase" TOTABLEALIAS="Rct">
    <FilterValues>
        <FilterValue FIELD="Role" VALUE="RCT"/>
    </FilterValues>
    <OutputFields>
        <OutputField NAME="MolRegno" HIDDEN="true"/>
        <OutputField NAME="MCHIME" PATH="RctMol"/>
        <OutputField NAME="MolWt" PATH="RctMol"/>
```

-continued

```
            </OutputFields>
        </Connector>
        <Connector NAME="Products" EXTENDS="ComponentBase" TOTABLEALIAS="Prd">
            <FilterValues>
                <FilterValue FIELD="Role" VALUE="PRD"/>
            </FilterValues>
            <OutputFields>
                <OutputField NAME="MolRegno" HIDDEN="true"/>
                <OutputField NAME="MCHIME" PATH="PrdMol"/>
                <OutputField NAME="MW" PATH="PrdMol"/>
            </OutputFields>
        </Connector>
        <Connector NAME="RctMol" TYPE="OneToOneDeferredConnector" FROMTABLE="Rct" TOTABLE="Mol"
                    TOTABLEALIAS="RctMol>
            <LinkFields>
                <LinkField FROMFIELD="MolRegno" TOFIELD="MolRegno"/>
            </LinkFields>
            <OutputFields>
                <OutputField NAME="MolWt"/>
                <OutputField NAME="CHIME_string(CTAB)" ALIAS="MCHIME" ISFUNCTION="true" TYPE="Structure"
                    MOLFORMAT="CHIME" SEARCHABLE="false"/>
            </OutputFields>
        </Connector>
        <Connector NAME="PrdMol" TYPE="OneToOneDeferredConnector" FROMTABLE="Prd" TOTABLE="Mol"
                    TOTABLEALIAS="PrdMol>
            <LinkFields>
                <LinkField FROMFIELD="MolRegno" TOFIELD="MolRegno"/>
            </LinkFields>
            <OutputFields>
                <OutputField NAME="MolWt"/>
                <OutputField NAME="CHIME_string(CTAB)" ALIAS="MCHIME" ISFUNCTION="true" TYPE="Structure"
                    MOLFORMAT="CHIME" SEARCHABLE="false"/>
            </OutputFields>
        </Connector>
```

Usage:

Query:select*,Reactants.*,Products.* from Rxn

Resulting Metadata:

Rxn

RIRegno

Reactants

MW

MCHIME

Products

MW

MCHIME

Notes:

1. Table aliases must be used since the same tables can be used in different joins. If aliases aren't used, queries will not provide the correct results.

2. Other components (catalysts, solvents, etc) can be split out by further extensions to the ComponentBase connector.

Pattern: One-to-many between tables with hidden lookup relationship

Example

Relating ACD Data to Beilstein Data with Hidden CDBRegno to BRN Translation

Table Structure:

Mol
        CDBRegno
        MDLNumber
    CTB5
        Compound_ID
        SDB_ID
        CDBRegno Connectors:

```
        <Connector NAME="Mol" TYPE="OneToManyDataConnector" TOTABLE="Mol">
            <OutputFields>
                <OutputField NAME="CDBRegno"/>
                <OutputField NAME="MDLNumber"/>
                <OutputField NAME="COMPOUND_ID" PATH="BRN_A.BRN_B" HIDDEN="true"/>
            </OutputFields>
        </Connector>
        <Connector NAME="BRN_A" TYPE="OneToOneDeferredConnector" FROMTABLE="Mol"
                    TOTABLE="CTB5" TOTABLEALIAS="a_ctb5">
            <LinkFields>
                <LinkField FROMFIELD="MDLNumber" TOFIELD="COMPOUND_ID"/>
            </LinkFields>
            <FilterValues>
                <FilterValue TOFIELD="SDB_ID" VALUE="2"/>
            </FilterValues>
            <OutputFields>
                <OutputField NAME="CDBREGNO" HIDDEN="true"/>
            </OutputFields>
        </Connector>
        <Connector NAME="BRN_B" TYPE="OneToOneDataConnector" FROMTABLE="a_ctb5" TOTABLE="CTB5"
                    TOTABLEALIAS="b_ctb5">
            <LinkFields>
                <LinkField FROMFIELD="CDBREGNO" TOFIELD="CDBREGNO"/>
            </LinkFields>
            <FilterValues>
                <FilterValue TOFIELD="SDB_ID" VALUE="1"/>
            </FilterValues>
            <OutputFields>
                <OutputField NAME="COMPOUND_ID"/>
            </OutputFields>
        </Connector>
        <Connector NAME="Beilstein" TYPE="DataSourceConnector" FROMTABLE="Mol">
            <LinkFields>
                <LinkField FROMFIELD="COMPOUND_ID" TOFIELD="BRN"/>
            </LinkFields>
            <OutputFields>
                <OutputField NAME="BRN"/>
                <OutputField NAME="Structure"/>
            </OutputFields>
        </Connector>
```

Usage:

Query: select *,Beilstein.* from mol

Resulting Metadata:

Mol

CDBRegno

MDLNumber

Beilstein

BRN

Structure Notes:

1. This pattern uses the DataSourceConnector which extends the OneToManyDataConnector to handle non-relational data sources. The usage of link fields, however, is the same.

2. ACD MDLNumbe'rs are related to Beilstein BRN's by using the CTB5 lookup table. The nature of this table requires 2 independent lookups each requiring the use of different filters. This is done via the 2 connectors and table aliases.

3. The Beilstein connector uses the Compound_ID field for linking without regard to its retrieval being deferred and requiring 2 other connectors for access. When the Beilstein parent is retrieved, the SQL necessary to retrieve the Compound_ID field will be executed then its value will be used by the Beilstein connector. These extra steps will occur transparently without being seen by either the user or the Beilstein connector.

Pattern: One-to-many between tables with pivoting of the resulting data

Example

Pivoting of Tall Skinny Data Associated with a Product

Table Structure:

```
Product
    PID
    ProductName
Data
    CDBRegno
    PropID
    PropValue
PropDict
    PropID
    PropName
```

Connectors:

```
<Connector NAME="Product"
TYPE="OneToManyDataConnector" TOTABLE="Product">
    <OutputFields>
        <OutputField NAME="PID" HIDDEN="true"/>
        <OutputField NAME="ProductName"/>
    <OutputFields>
</Connector>
<Connector NAME="Properties" TYPE="PivotConnector"
FROMTABLE="Product" TOTABLE="Data">
    <LinkFields>
        <LinkField FROMFIELD="PID" TOFIELD="PID"/>
    </LinkFields>
    <OutputFields>
        <OutputField NAME="PID"/>
        <OutputField NAME="PropID"/>
        <OutputField NAME="PropValue"/>
    </OutputFields>
    <PivotParams>
        <IndexFields>
            <Field>PID</Field>
        </IndexFields>
        <FieldsToPivot>
            <Field>Name</Field>
        </FieldsToPivot>
        <ValuesToPivot>
            <Field>PropValue</Field>
        </ValuesToPivot>
```

-continued

```
        <PivotedFields>
            <MetaData>
                <FieldDef NAME="Name" TYPE="VariableText"/>
                <FieldDef NAME="CAS" TYPE="VariableText"/>
                <FieldDef NAME="Comment" TYPE="VariableText"/>
                <FieldDef NAME="Purity" TYPE="VariableText"/>
            </MetaData>
        </PivotedFields>
    </PivotParams>
</Connector>
<Connector NAME="PropIDToName"
TYPE="OneToOneDataConnector" FROMTABLE="Data"
TOTABLE="PropDict">
    <LinkFields>
        <LinkField FROMFIELD="PropID"
        TOFIELD="PropID"/>
    </LinkFields>
    <OutputFields>
        <OutputField NAME="Name"/>
    </OutputFields>
</Connector>
```

Resulting metdata:

Usage:

Query: select ProductName,properties.* from Product where Properties.name like '% foo %'

Resulting Metadata:

Product
ProductName
Properties
  Name
  CAS
  Comment
  Purity

Notes:

1. This pattern illustrates the use of the pivoting to transform data. The inclusion of the <MetaData> element provides a way to declare what the pivoted data will look like allowing queries to be executed transparently. Without a <MetaData> element, queries have to be done over non-pivoted data which is quiet user hostile. Note that the this connector can be configured on-the-fly during IDS initialization so that the contents of the <MetaData> element can be determined at run time. For details, see information on the IIDSInitializer interface.

2. The translation of property id (PropID) to property name (Name) is done by the PropIDToName connector which is invoked automatically when the Name field is not found defined by the PivotConnector itself.

3. Queries over pivoted data can be complex because each query clause translates into at least 2 different clauses executed over the non-pivoted data. Each of these expressions must use a different table alias to keep the queries from interfering with each other. The PivotConnector handles this transparently.

What is claimed is:

1. A method for dynamically creating a hierarchy for use in searching one or more databases, each of the one or more databases having a data model, the method comprising:
  extracting a data model from each of the one or more databases, wherein each data model describes two or more data objects stored in a respective database of the one or more databases, and describes at least one relationship between the data objects;

defining a data network comprising a plurality of nodes, a plurality of connectors, and at least one root connector, wherein each of the plurality of connectors describes a relationship between two or more of the plurality of nodes, the plurality of connectors nodes being based on the two or more data objects in the extracted data model, the plurality of connectors being based on relationships in the extracted data model, and the at least one root connector defining an entry point into the data network;

receiving a search query on the data network regarding data stored in the one or more databases, the search query specifying a root connector and at least one of the two or more nodes, wherein the at least one of the two or more nodes is specified in the search query as a member of a hierarchy having the specified root connector at its root level;

translating, using a computer, the search query on the data network into a query that is configured to run on the one or more databases, wherein the translation comprises a dynamic creation of a hierarchy based on the specified root connector and the specified nodes; and searching the one or more databases with the translated query.

2. A method as in claim 1, wherein one or more of the plurality of nodes comprise a data source.

3. A method as in claim 2, wherein the two or more of the plurality of nodes comprise a source node linked to one or more linked nodes via at least one connector.

4. A method as in claim 3, wherein the at least one connector comprises output field elements and defines relationships between the source node and the one or more linked nodes.

5. A method as in claim 4, wherein the hierarchy is built based on the output fields and the relationships.

6. A method as in claim 1, wherein the data network is defined based on a relational data model.

7. A method as in claim 1, wherein the extracting a data model comprises analyzing the data model to identify the data objects to be exposed.

8. A method as in claim 7, wherein the extracting a data model further comprises analyzing an inheritance tree for each of the identified data objects.

9. A method as in claim 7, wherein the extracting a data model further comprises analyzing relationships between the data objects.

10. A method as in claim 9, wherein the relationships between the data objects comprise multiplicity relationships and reciprocal relationships.

11. A method as in claim 7, wherein the extracting a data model further comprises defining a plurality of connectors for each of the data objects.

12. A method as in claim 11, wherein the defining connectors for each of the data objects results in exposing relevant data in a hierarchy appropriate for the data object.

13. A method as in claim 11, wherein the plurality of connectors form subnetworks.

14. A method as in claim 13, wherein, for each subnetwork, the connectors therein are modified to reflect relationships between data objects in the network.

15. A method as in claim 11, wherein the plurality of connectors comprise connectors that transform data.

16. A method as in claim 11, wherein the plurality of connectors comprise connectors that integrate data from external sources.

17. A method as in claim 1, further comprising forming the received search query by:
selecting desired fields;
specifying a root; and
specifying a search condition.

18. The method of claim 17, wherein the step of specifying a root comprises specifying a FROM clause.

19. The method of claim 1,
wherein the set of connectors comprises one or more of the following: one to many connector, one to one connector, calculator connector, or pivot connector,
wherein the calculator connector performs calculations on specified fields using a specified custom calculator, and
wherein the pivot connector pivots data from a node linked to the pivot connector.

20. A system for dynamically creating a hierarchy for use in searching one or more databases, the system comprising:
one or more host computers, on which the one or more databases reside;
a data model extracted from each of the one or more databases, wherein each data model describes two or more data objects stored in a corresponding one of the one or more databases, and describes at least one relationship between the two or more data objects;
a data network, based on the data model, comprising:
a plurality of nodes based on the two or more data objects;
a plurality of connectors describing a relationship between two or more of the plurality of nodes based on the relationships in the data model; and
at least one root connector defining an entry point into the data network; and
a query server, in electronic communication with the data network, configured to:
search the data network with a query regarding data stored in one or more databases, the query specifying a root connector and at least one of the two or more of the plurality of nodes, and the at least one of the two or more of the plurality of nodes being specified in the query as members of a hierarchy having the specified root connector at its root level;
receive and translate the query into a translated query that can run on the one or more databases, the translated query comprising a dynamic creation of a hierarchy based on the specified root connector and the specified nodes; and
search the one or more databases with the translated query.

21. A system as in claim 20, wherein the query is adapted to:
select desired fields;
specify a root; and
specify a search condition.

22. A system as in claim 20, wherein the query server is operable to receive electronic communications from and transmit electronic communications to a user terminal via an electronic communication network, and the system further comprises:
one or more database servers, each of which is in electronic communication with the query server, wherein each of the one or more database servers is operable to search the one or more databases;
wherein the query server is operable to receive the query over the electronic communication network from the user terminal and, based on the query, dynamically create one or more hierarchies.

23. A system as in claim 22, wherein the one or more hierarchies are created based on data networks.

24. A system as in claim 23, wherein the data networks comprise nodes connected by connectors, and wherein each node corresponds to a set of data.

* * * * *

UNITED STATES PATENT AND TRADEMARK OFFICE
CERTIFICATE OF CORRECTION

PATENT NO. : 7,912,845 B2  Page 1 of 1
APPLICATION NO. : 12/482353
DATED : March 22, 2011
INVENTOR(S) : James F. Barstow It is certified that error appears in the above-identified patent and that said Letters Patent is hereby corrected as shown below:

IN THE SPECIFICATION:

In Column 31, Line 43:  Replace "IICSError" with --nt.IICSError--

In Column 31, Line 45: before "initialize"  Add -- [Method Detail] --

In Column 32, Line 49: before "initialize"  Add -- [Method Detail] --

Signed and Sealed this
Twenty-ninth Day of May, 2012

David J. Kappos
*Director of the United States Patent and Trademark Office*